(12) United States Patent
Takagi et al.

(10) Patent No.: US 7,502,995 B2
(45) Date of Patent: Mar. 10, 2009

(54) PROCESSING STRUCTURED/HIERARCHICAL CONTENT

(75) Inventors: Hironobu Takagi, Yokohama (JP); Chieko Asakawa, Kawasaki (JP)

(73) Assignee: International Business Machines Corporation, Armonk, NY (US)

(*) Notice: Subject to any disclaimer, the term of this patent is extended or adjusted under 35 U.S.C. 154(b) by 1330 days.

(21) Appl. No.: 10/692,222

(22) Filed: Oct. 23, 2003

(65) Prior Publication Data

US 2005/0050044 A1 Mar. 3, 2005

(30) Foreign Application Priority Data

Oct. 28, 2002 (JP) .............................. 2002-312331

(51) Int. Cl.
*G06F 17/30* (2006.01)
(52) U.S. Cl. .................. 715/234; 715/243; 707/3; 707/6
(58) Field of Classification Search ................. 715/230, 715/234, 237, 243, 255; 707/1, 2, 6, 3; 717/141, 717/143, 144
See application file for complete search history.

(56) References Cited

U.S. PATENT DOCUMENTS

| | | | | |
|---|---|---|---|---|
| 5,983,268 | A * | 11/1999 | Freivald et al. | 709/218 |
| 6,487,566 | B1 * | 11/2002 | Sundaresan | 715/235 |
| 6,826,553 | B1 * | 11/2004 | DaCosta et al. | 707/1 |
| 6,826,568 | B2 * | 11/2004 | Bernstein et al. | 707/6 |
| 6,859,797 | B1 * | 2/2005 | Skopicki | 706/20 |
| 6,970,602 | B1 * | 11/2005 | Smith et al. | 382/232 |
| 7,315,981 | B2 * | 1/2008 | Nakamura et al. | 715/234 |
| 7,437,664 | B2 * | 10/2008 | Borson | 715/234 |
| 2004/0010752 | A1 * | 1/2004 | Chan et al. | 715/513 |
| 2004/0103091 | A1 * | 5/2004 | Lindblad et al. | 707/3 |
| 2006/0004817 | A1 * | 1/2006 | Andrews | 707/101 |
| 2007/0168327 | A1 * | 7/2007 | Lindblad et al. | 707/2 |
| 2008/0092034 | A1 * | 4/2008 | Lim et al. | 715/234 |

FOREIGN PATENT DOCUMENTS

| | | |
|---|---|---|
| JP | 2000-227996 | 8/2000 |
| JP | 2001-259846 | 9/2001 |

OTHER PUBLICATIONS

Japanese Publication No. 2002-245068 published on Aug. 30, 2002.
Japanese Publication No. 2001-333266 published Nov. 30, 2001.
Kentaro Fukuda, et al., Common layout automatic analysis between Web contents, Research Report of Information Processing Society of Japan, May 25, 2001, vol. 2001, No. 52, pp. 7-14, 2001-DD-28-2.

* cited by examiner

*Primary Examiner*—Adam L Basehoar
(74) *Attorney, Agent, or Firm*—Scully, Scott, Murphy & Presser; Shimokaji & Associates, P.C.

(57) ABSTRACT

Target subtree setting means sets a target subtree relating to a content portion. Occurrence mode detecting means collates a target subtree relating to a content with a tree relating to each of past structured/hierarchical contents and detects an occurrence mode of each node of the target subtree. Statistical information generating means generates statistical information concerning an occurrence frequency of the occurrence mode of each node in the target subtree. Classifying means classifies each node of the target subtree based on the statistical information and a result of detecting the occurrence mode. Matching pattern generating means generates the matching pattern for the target content portion based on the classification. The structured/hierarchical contents are identified by use of the matching pattern.

1 Claim, 28 Drawing Sheets

(a)

A "flag" is not an army.

"When he said 'Show the flag,' I think that he was not going so far as to be considering sending the army." Amb. Baker explained the statement by the high official in the US State Department that is to have an effect on the Special Anti-Terrorism Bill. (20:13) Full text > >

(b)

A "flag" is not an army.

"When he said 'Show the flag,' I think that he was not going so far as to be considering sending the army." Amb. Baker explained the statement by the high official in the US State Department that is to have an effect on the Special Anti-Terrorism Bill.

(20:13) Full text > >

| ▲ Updated | News | Society | Sports | Economics | Politics | International | Arts and Culture | People | Obituaries |

· Announcements and Notifications, Such As Increased Security for Water Systems: Ministry of Health, Labor, and Welfare on Domestic Terrorism Security Measures (20:49)
· Proposal by the Minister for Administrative Reform to Restructure Public Companies: Total Liquidation of 18 Corporations and Privatization of 16 (20:38)
· Israeli Prime Minister Warns the Americans -- "Do Not Negotiate with Arab States!" (21:07)
· Taliban Ambassador: "If the US Can Produce Evidence, Trials May Be Held in Afghanistan" (20:24)
· Rhodes Ends up with 55 < Pacific League on the 5th) (21:26)

(b)

| ▲ Updated | News | Society | Sports | Economics | Politics | International | Arts and Culture | People | Obituaries |

| Announcements and Notifications, Such As Increased Security for Water Systems: Ministry of Health, Labor, and Welfare on Domestic Terrorism Security Measures (20:49) |
| Proposal by the Minister for Administrative Reform to Restructure Public Companies: Total Liquidation of 18 Corporations and Privatization of 16 (20:38) |
| Israeli Prime Minister Warns the Americans -- "Do Not Negotiate with Arab States!" (21:07) |
| Taliban Ambassador: "If the US Can Produce Evidence, Trials May Be Held in Afghanistan" (20:24) |
| Rhodes Ends up with 55 < Pacific League on the 5th) (21:26) |

Fig. 14

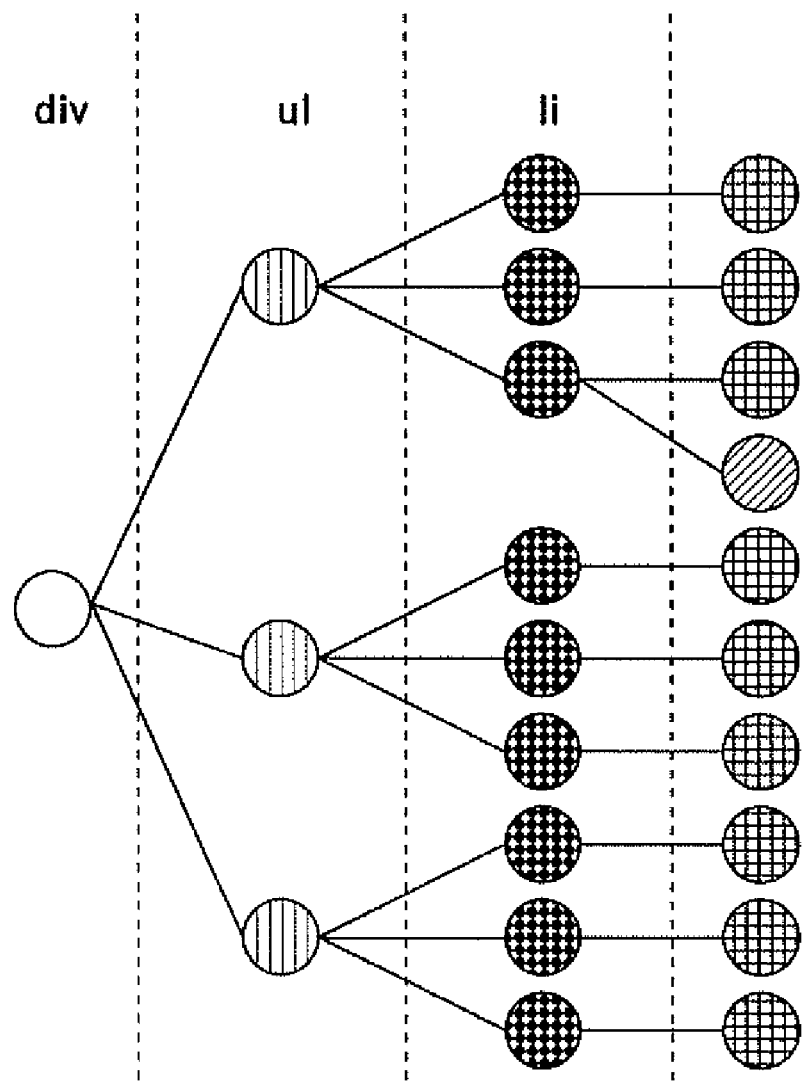
 UPDATED TEXT NODE
 INSERTED IMAGE
FIG. 15

| | | | | | | | | | | | | | | | | | | |
|---|---|---|---|---|---|---|---|---|---|---|---|---|---|---|---|---|---|---|
| DISTANCE VECTOR AT FIRST STAGE | -1 | 7 | 2 | 2 | 2 | 2 | 3 | 3 | 7 | 2 | 2 | 2 | 2 | 2 | -1 | -1 | -1 | -1 |
| DISTANCE VECTOR AT SECOND STAGE | -1 | 14 | 4 | 4 | 5 | 5 | 5 | 5 | -1 | 4 | 4 | 5 | 5 | -1 | -4 | -4 | -1 | -1 |
| DISTANCE VECTOR AT THIRD STAGE | -1 | -1 | 7 | 7 | 7 | 7 | 7 | -1 | -1 | 7 | 7 | 7 | 7 | -1 | -1 | -1 | -1 | -1 |
| DISTANCE VECTOR AT FOURTH STAGE | -1 | -1 | 9 | 9 | 9 | 10 | 10 | -1 | 9 | 9 | 9 | 9 | -1 | -1 | -1 | -1 | -1 | -1 |

FIG. 17

ADDITIONAL NODE PORTION

| | |
|---|---|
| (Hobbies) | Olympus Optical: Binoculars with a High Speed Digital Camera |
| (PC) | Sotec: ¥70,000 Low-end PC |
| (PC) | HP: Server with up to Eight 64-Bit CPUs |
| (PC) | Konica: Small Digital Camera That Keeps Batteries from Wearing Out |
| (Hudson) | Fighting Game for GameCube |
| (Automotive) | Suzuki: Will Release 12 Models, of 5 Makes, of "Ultralow Emission Vehicles |
| (Industry) | Calpis: Products to Be Limited to Specific Seasons -- "Taste the Season with Calpis-- Okinawa Pineapple" |
| (Industry) | Nissin: Cheese Tan Tan Noodles in the "Nissin Chinese Kitchen" |
| (Industry) | Asahi Beverages: New Brand of Coffee Drink |
| (Industry) | Taisho: Instant Freezing Prevents Itching |
| (Industry) | YKKAP: Wood-Pattern Front Door |
| (Industry) | Matsushita Denko: Wide Door |
| (Industry) | Triumph: Opaque Undergarments, Invisible under Even Thin Clothes |
| (Industry) | Honda: Four Models of Push Mowers |

Fig. 19

News LYCOS

Topix
Isahaya Bay: Construction Begins amongst Tension
Al Qaeda Combatants Surrendered to the US
Microsoft Enters the Home Electronics Market
Publication of the "Inoki Mail Magazine"
SMAP Inagaki: Memoirs
Ishii from the Dodgers: Towards Birth
    [More]

Fig. 20

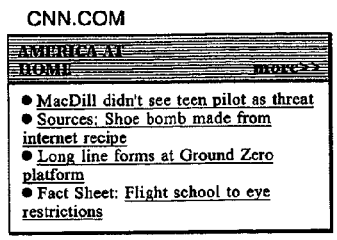

Fig. 21

| |
|---|
| Economics (Updated on January 9, 2:04 PM)        Economics \| Industry \| Markets |
| Nissan Motors: Plan for Announcing Results for Quarter 4 -- Quarterly Earnings Anticipated to Be Better Than Previously Believed<br>-- Bloomberg<br>Detroit, January 8 (Bloomberg): Nissan Motors of the French result group is planning on announcing quarterly results every three months in order to improve transparency for the investors. Carlos Ghosn of Nissan Motors made this announcement in an interview with Bloomberg News on the eighth at the North American International Automobile Expo held in Detroit. [Full Text] [Topics] |
| Society (Updated January 9, 1:42 PM)        List of Articles>> |
| < Snow Accumulation in the Tokai Region > The Bullet Train Is on a Delayed Schedule Even in the Low-Lying Areas, Such As Nagoya City-Mainichi News<br>The winter pattern high-pressure system has grown stronger, with snowfall even in the low-lying areas of the Tokai Region, such as Nagoya City, on the morning of the ninth. Commuters can be seen rushing to school and to work against the winter scenery. 5 cm of snow accumulation is predicted in many areas this afternoon, even in low-lying regions, where the Meteorological Observatory predicts hazardous conditions, due to snow accumulation and road ice,... [Full Text] |
| Politics (Updated January 9, 11:15 AM)        List of Articles>> |
| Visit to the Asian History Resource Center = Chief Cabinet Secretary Fukuda – Jiji Communications<br>Chief cabinet secretary Yasuo Fukuda visited the Asian History Resource Center Hirakawa-cho in Tokyo to inspect progress in making materials available to the public over the Internet. After the inspection, Sec. Fukuda remarked that "t Progress is a little too slow. Providing accurate information is critical for the future. This is significant for both the Japanese people and for other countries in Asia... [Full Text] |

| Index |
|---|
| ◉ Weather/Season |
| ◉ Business |
| ◉ Sports |
| ◉ Finance/Economy |
| ◉ Net Information |
| ◉ Politics |
| ◉ International |
| ◉ Arts and Culture |
| ◉ Lifestyle |
| ◉ Science and Nature |
| ◉ Commentary |
| ◉ English |
| ◉ Morning Edition |

(b)

| Index |
|---|
| ◉ Weather/Season |
| ◉ Business |
| ◉ Sports |
| ◉ Finance/Economy |
| ◉ Net Information |
| ◉ Politics |
| ◉ International |
| ◉ Arts and Culture |
| ◉ Lifestyle |
| ◉ Science and Nature |
| ◉ Commentary |
| ◉ English |
| ◉ Morning Edition |

Fig. 23

Series of Protests at Daiei – Won't Play Ball with Rhodes

Professional Baseball Team Daiei, September 30: The ripple effect of the incident wherein Daiei, at its last meeting with Kintetsu (at the Fukuoka Dome), shut down the outfielder, Rhodes, who is attempting to set a new Japanese homerun record, are spreading. Commissioner Hiromori Kawashima of the NPP (Nippon Professional Baseball) gave a statement indicating his annoyance October 1, saying "It would be hard to believe that a baseball fan could have issued such an order." The Daiei Club has received several dozen protests, telephone calls, and mail inquiries.

On the September 30, Outfielder Rhodes arrived at the game with Daiei having tied the record of 55 home runs in a season, held by the Daiei Coach Oh. However, on instructions from Battery Coach Wakana, almost no strikes were thrown to Rhodes.

During the match, there was a chorus of angry shouts from the Daiei fans as well: "Can't you play fairly?"

The Commissioner made a statement on October 1 in response, complaining that "(Intentionally depriving someone of the opportunity to set a record) is contrary to the essence of baseball, which values fair play above all else. This not only put a black mark on the record that has been saved, but put a black mark the character of the player that holds that record as well."

In 1965 [sic -- "1985"?], when Bass, who played for Hanshin, was one [homerun] from the record, the intentional-walk strategy was used against him in a game versus the Giants, coached by Coach Oh. Coach Oh, who again is embroiled in a "fairplay debate," explained that "I think that Tanoue, whose highest win ratio was in jeopardy, did not want to risk a hit. While I understand where the fans are coming from, it is all just part of the game."

On the other hand, coach Ogi of Orix, which has two more games against Kitentsu, says that "the games will be played in the same way they have always been played. If we can keep (Kitagawa, who is scheduled to be the prior hitter in the lineup on October 2) from getting a hit, this will improve the level of confidence, and even if he gets a hit on us, it will just provide more experience."

Kazuo Sayama, an author that is quite knowledgeable about Japanese-American baseball, is concerned that "On the day that Ichiro broke Joe Jackson's rookie hit record, in Japan the thought was "He did it to an American." Over there, they did not to anything to get in the way of Ichiro's record. I have heard that they were catcalls even from the Daiei fans -- this is the type of thing you lose fans over." (0026)

www.asahi.com/sports/update/1001/009.html

Fig. 24

Series of Protests at Daiei – Won't Play Ball with Rhodes

Professional Baseball Team Daiei, September 30: The ripple effect of the incident wherein Daiei, at its last meeting with Kintetsu (at the Fukuoka Dome), shut down the outfielder, Rhodes, who is attempting to set a new Japanese homerun record, are spreading. Commissioner Hiromori Kawashima of the NPP (Nippon Professional Baseball) gave a statement indicating his annoyance October 1, saying "It would be hard to believe that a baseball fan could have issued such an order." The Daiei Club has received several dozen protests, telephone calls, and mail inquiries.

On the September 30, Outfielder Rhodes arrived at the game with Daiei having tied the record of 55 home runs in a season, held by the Daiei Coach Oh. However, on instructions from Battery Coach Wakana, almost no strikes were thrown to Rhodes.

During the match, there was a chorus of angry shouts from the Daiei fans as well: "Can't you play fairly?"

The Commissioner made a statement on October 1 in response, complaining that "(Intentionally depriving someone of the opportunity to set a record) is contrary to the essence of baseball, which values fair play above all else. This not only put a black mark on the record that has been saved, but put a black mark the character of the player that holds that record as well."

In 1965 [sic -- "1985"?], when Bass, who played for Hanshin, was one [homerun] from the record, the intentional-walk strategy was used against him in a game versus the Giants, coached by Coach Oh. Coach Oh, who again is embroiled in a "fairplay debate," explained that "I think that Tanoue, whose highest win ratio was in jeopardy, did not want to risk a hit. While I understand where the fans are coming from, it is all just part of the game."

On the other hand, coach Ogi of Orix, which has two more games against Kitentsu, says that "the games will be played in the same way they have always been played. If we can keep (Kitagawa, who is scheduled to be the prior hitter in the lineup on October 2) from getting a hit, this will improve the level of confidence, and even if he gets a hit on us, it will just provide more experience."

Kazuo Sayama, an author that is quite knowledgeable about Japanese-American baseball, is concerned that "On the day that Ichiro broke Joe Jackson's rookie hit record, in Japan the thought was "He did it to an American." Over there, they did not to anything to get in the way of Ichiro's record. I have heard that they were catcalls even from the Daiei fans -- this is the type of thing you lose fans over." (0026)

| ▲ Related Information |
|---|
| · Articles about Unfortunate Bigotry in Japanese Baseball<br>· Tuffy Rhodes Ties the Homerun Record |

(b)

| ▲ Related Information |
|---|
| · Articles about Unfortunate Bigotry in Japanese Baseball<br>· Tuffy Rhodes Ties the Homerun Record |

| | Final Update |
|---|---|
| Nikkei Average | 10,205.87 |
| | +0.39 |
| Topix | 1070.45 |
| | -0.74 |
| | Search Stock Prices |
| | |

(b)

| | Final Update |
|---|---|
| | 10,205.87 |
| | +0.39 |
| | 1070.45 |
| | -0.74 |
| | |

Fig. 31

| · Related Websites |

· Congressional Budget Office
· CNN.co.jp
· Daytrader Net
· eBenKei.com
· FRB
· U.S. Treasury

| · Related Websites |
· International News
· Economy/Industries
· United States

| · Lycos Service |
· Lycos Manner
US Stocks
· Lycos Bulletin Board

| · Related Topics |
· NY Stock Market
· Foreign Exchange

| · Search News |

[    ]  | Search |

· Topics
[US
Japanese Newspaper
[Washington
[Losses Caused
Me Total
 Based on Meetings Relationship =

· Related

2001
· Japan
Finance
· US

· Japan
· NY

| Search Articles | | |
|---|---|---|
| Re: Japan<br>Japan<br>News<br>Can<br>Use<br>Regulations<br>regarding | Documents Retrieved: 1-5<br><br>Search Term:<br>Voice Server<br>From All ZDNet<br>1.00 per Page in the Recommended Order  Search | Number of Keywords: 1,234,567,890   103<br>Search Update: May 1, 2002 |
| National<br>· China<br>· Holland<br>· Portugal<br>· Russia<br>· South Africa<br>· Thailand<br>· UK<br>· US | Search Results<br><br>Number of Reference Hits: ["List": 489] ["Server": Ignored -- Too Many Hits.]<br><br>489 Documents Matching the Search Equation<br><br>ZDNet: NetLife-Gear-Olympus Optical Engineering JG Recorder "Voice-Trek DS-1" "Voice-Trek DS 660" Announcement<br>(http://www.oly...)<br>Photo Olympus Optical Engineering announced the "Voice-Track DS-1" and "Voice of Contract GS-650" IC Recorders, Packaged<br>together with a PC, on September 8, 2000...<br>http://www.dxnet.co.jp/xxx/yyyyy/zzzzzzz/abcde.html<br><br>ZDNN: Web Surfing by Voice Alone? One Voice New Voice Technology "IV IT" Announced<br>One Voice Technology, which is currently investigating a tie up with a PC manufacturer as well, announced on October 4 That two-<br>way communications enabling web navigation by talking to the PC in natural language...<br>http://www.dxnet.co.jp/xxx/mmmmm/qqqqqq/efgh.html<br><br>Net Internet News: Just Corp. Voice Product Portal Site "Voice Word" Opens<br>Just Corp. has opened the "Voice Word" gateway for voice products.<br>Tieups with products from other companies...<br>http://www.dxnet.co.jp/hhh/uuuu/pppppp/bhuio.html<br><br>Net Enterprise: Japan IBM Announces the "Web Sphere Voice Server V2.0" Enabling Access to the Web Via Voice<br>Japan IBM (IBM Japan announced on October 30 the "Web Sphere Voice Server" software that enables the use of web applications<br>via voice...<br>http://www.dxnet.co.jp/hhh/uuuu/pppppp/bhuio.html<br><br>Net Internet: "Sniffer Voice 2.0 J" That Performs Troubleshooting of Enterprise Voice over IP Announced<br>In the Spring of next year, compatibility with DSS RMON Pro, for finding problems in a voice-over-IP networsk, by Japan Network<br>Solutions...<br>Beginning on November 1, protocols relating to voice over IP...<br>http://www.dxnet.co.jp/ffff/wwwww/pppppp/mnbvc.html | 104 |

Fig. 33

PROCESSING STRUCTURED/HIERARCHICAL CONTENT

FIELD OF INVENTION

The present invention relates to processing structured/hierarchical content, suitable for processes such as reuse of an annotation and cutout of a Web content. More specifically, the present invention relates to processing the structured/hierarchical content, capable of generating a matching pattern by which the structured/hierarchical content to be subjected to the processing such as the reuse of an annotation and the cutout of a Web content can be detected appropriately.

BACKGROUND OF THE INVENTION

In recent years, from various viewpoints, attention has been paid to research on highly efficient reuse of portions in Web pages which are present in large amounts and include important contents, by cutting out and converting the portions into individual parts. Note that, in this specification, the term "cutout" is used in meaning for general use by those skilled in the art, and by the "cutout," "cutout" portions are not deleted from a Web content from which the portions are "cut out." Strictly speaking, the "cutout" in this specification is to copy a range of target content portions in an original Web content or the like in order to paste the target content portions to another Web page or the like.

In the field of Web services, content cutout has attracted attention as a bridging technology for bridging the existing HTML contents and the Web services. For example, the existing server system can be adapted to the Web services as it is by cutting out, for example, an HTML form for searching an article on a news site and by defining XML input/output to the HTML form.

Moreover, in the field of information portals, which aggregate various types of information and provide portal pages coinciding with requests of users, partial components in the existing Web pages are important contents. Regions of top news and headlines are cut out from various news sites and are freely combined, thus making it possible to expand the contents to a great extent. Actually, in the mySiteOutliner, the WebSphere Portal Server or the like, a mechanism for incorporating a part of the existing Web pages into the portal pages is provided as a part of the product.

In addition, a standard, which allows a third party to utilize information updated on Web sites and the like by providing the information in an XML form called RSS (Rich Site Summary), has been widespread. At present, the RSS is generated by preparing an exclusive server-side program (CGI and the like). However, if the page cutout technology is used, then conversion of a headline list in a page into the RSS makes it possible to provide a dynamic and highly immediate RSS.

Furthermore, in the field of transcoding, a technology has been researched, in which important information in Web pages is submitted preferentially, thus converting the Web pages into pages which are easy for users of pervasive devices and amblyopia users using enlarged browsers to read. A function of conducting page clipping based on annotation description on the XPath base is implemented also in the IBM WebSphere Transcoding Publisher.

As described above, it has been known that the part of the Web content can be reused highly efficiently by being cut appropriately.

(1) As methods for cutting out the part of the Web pages in the related art, there are two methods, which are:

(a) a method using the XPath; and (b) a method using an original tag.

(a) Method Using XPath:

The method using the XPath is a powerful method when the Web pages are assured to be static and unchanged. For example, in the non-patent document 1, the cutout of a content by use of XPath designation is implemented in order to generate pages for portable terminals. However, the designation is troublesome, an application range thereof is narrow, and so on, and therefore, actually, another type of pages for the portable terminals is frequently prepared. Specifically, this method is not actually widespread. Moreover, in the non-patent document 2, a schema is proposed, in which a part of Web pages is selected, and an input portion and an output portion are selected, thus easily enabling the Web pages to be incorporated into the Web services. Although this technology is excellent in that the Web pages can be easily cut out and coupled to the services, the technology involves a problem that it depends on the XPath with regard to the cutout. Furthermore, in the non-patent document 3, a list of images and articles is cut out from the top page of the home page of IBM and the like by use of the Xpath, and the cutout list is incorporated into a part of a "personal newspaper." The cutout portions are shifted due to a layout change. Therefore, the shift of the cutout portions is coped with by manually correcting the definition file of the Xpath, followed by automatically delivering the cutout portions.

(b) Method Using Original Tag:

In this method, the original tag is mixed into HTML tags. A particular character string is sometimes designated for an HTML comment. This method is widely used in a portal service such as LYCOS and YAHOO. For example, this method is used for the purpose of displaying an explanation of recommended goods on a shopping page also onto the top page. Because this method can be processed by the simple HTML parser and the like, this method is frequently used in the case of using the HTML parser. This method involves a problem that an original content must be changed.

Related arts similar to the present invention will be listed below though they are not the technologies for cutting out the part of the Web page content.

(2) Dynamic Annotation Matching Method Using XPath Set as Key (Japanese Patent Application No. 2001-333260 not Yet Laid-Open at the Time of Preparing this Specification):

In this method, an XPath included in an annotation is used as a key, and a suitable candidate for the annotation is selected from the plurality of candidates therefor. According to this method, a correct annotation matching has been enabled in many cases by preparing annotations sufficient for covering the entire layout. However, also in many cases, the XPath indicates an incorrect node at an authoring step. As functions for correcting this incorrect node, functions such as an empty content alert, a leaked text alert and a semi-automatic correction of the XPath have been developed. However, in the actual situation, adjustment work is troublesome.

(3) Other Annotation Matching Methods:

In many cases such as an RDF, the annotations and the pages are matched by use of a collation table and a normal expression of a URL. The present invention greatly differs from these methods in that it performs dynamic matching with the content.

(4) Finite Difference Calculation and Use Thereof:

As services/technologies for submitting and reusing only updated information and transmitting a notification mail by use of a finite difference calculation, DiffWeb (example: non-patent document 4), HTML Diff (example: non-patent document 5), MindIt (example: non-patent document 6) and the like have been known. In these technologies, a finite difference calculation is performed between a "last past page" and a present page, and a content obtained as the difference is utilized. On the contrary, the present invention is greatly different from these technologies in that an object thereof is to "generate a matching pattern." In addition, in the constituent technologies, the present invention also greatly differ from these technologies in finite difference calculations and statistical processing with past pages in plural versions, a concept of adjacent pages and finite difference calculations therewith, and the like.

(5) Simplification Technology by Finite Difference Calculation (Patent Document 1):

In this technology, specific information is taken out from the page by use of a finite difference calculation, and the information is simplified. Although this technology is common to the present invention in that adjacent pages are listed up and the finite difference calculations are performed therewith, this technology does not suggest a specific method for cutting out a part of the Web content.

(6) Matching Technology for a Tree Structure:

As matching technologies for a tree structure by use thereof, a normal expression matching technology (TRex), a matching of the tree structure based on the hedge automaton theory and an application thereof to schema languages (relax and relaxNG) and the like have been researched. These technologies are technologies for searching subtrees (nodes) to be matched with the tree structure on the premise that a matching pattern exists, and do not suggest that they relate to automatic generation of the matching pattern.

(7) Technology Related to Automatic Generation of Matching Pattern:

There is a technology called "Examplotron" which automatically generates schema description to be matched with a group of XML samples. This technology is similar to the present invention in that a certain type of matching pattern is automatically generated from a group of XML files. However, this technology is different from the present invention to be described later in that a subject thereof is a group of "well-formatted" XML files "in conformity with a certain tacit schema" and that a strict matching pattern is generated by use of an "embedding structure" of the tags as a key.

(8) Efficiency Enhancement for Work of Adding Annotations (Patent Document 2):

A common annotation is added to page files analogous to each other in layout structure, and thus an efficiency enhancement for work of adding annotations is attempted. A determination as to whether the page files are analogous in layout structure is performed based on a collation of structural description formulae, and a matching pattern based on statistical information relating to occurrence modes and occurrence frequencies of nodes is not utilized.

[Patent Document 1]
  Japanese Patent Laid-Open No. 2002-55872

[Patent Document 2]
  Japanese Patent Laid-Open No. 2002-245068

[Non-Patent Document 1]
  WTP (WebSphere Transcoding Publisher,

[Non-Patent Document 2]
  CHIP[I] Ito "Construction method of distributed applications by integration of GUI parts and WEB services," Japan Society for Software Science and Technology WISS 2001 Proceedings

[Non-Patent Document 3]
  IBM mysite Outliner

[Non-Patent Document 4]
  DiffWeb

[Non-Patent Document 5]
  HTML Diff

[Non-Patent Document 6]
  MindIt

SUMMARY OF THE INVENTION

It is an aspect of the present invention to provide an apparatus, a method and a program, which exert a great effect when performing processing such as, for example, cutout of a part of structured/hierarchical contents delivered through a network and reuse of an annotation common thereto.

It is another aspect of the present invention to provide a processing apparatus for a structured/hierarchical content, a processing method for the structured/hierarchical content and a processing program for the structured/hierarchical content, which are capable of attaining, for example, the cutout of the part of the structured/hierarchical contents and the reuse of the annotation common thereto without using an XPath and adding a tag.

In the present invention, in order to identify whether or not contents are the structured/hierarchical contents subjected to the processing such as the partial cutout of the contents and the reuse of the annotation common to a plurality of contents, not an XPath but a matching pattern is used.

In the present invention, past and/or adjacent structured/hierarchical contents with respect to a target content are checked, and respective nodes are classified based on statistical information relating to occurrence modes of the nodes in a target subtree and occurrence frequencies of the occurrence modes, thus generating the matching pattern.

In an embodiment of a processing apparatus for a structured/hierarchical content of the present invention, it is determined whether or not a structured/hierarchical content delivered through a network includes a content portion matched with a predetermined matching pattern, and if a result of the determination is positive, then predetermined processing is performed for the structured/hierarchical content. Moreover, the processing apparatus for a structured/hierarchical content includes: target subtree setting means for setting a target subtree relating to a range including a target content portion as an extracted portion of the matching pattern in the structured/hierarchical content (hereinafter, referred to as a "target content") from which the matching pattern is to be extracted; occurrence mode detecting means for detecting an occurrence mode of each node of the target subtree by selecting a plurality of past structured/hierarchical contents with respect to the target content and collating the target subtree relating to the target content with a tree relating to each of the past structured/hierarchical contents; statistical information generating means for generating statistical information concerning an occurrence frequency of the occurrence mode of each node in the target subtree based on the plurality of past structured/hierarchical contents; classifying means for performing classification of each node of the target subtree based on the statistical information and a result of detecting the occurrence mode; and matching pattern generating means for generating the matching pattern for the target content portion based on the classification.

In a processing method for a structured/hierarchical content of the present invention, it is determined whether or not a structured/hierarchical content delivered through a network includes a content portion matched with a predetermined matching pattern, and if a result of the determination is positive, then predetermined processing is performed for the structured/hierarchical content.

Moreover, an embodiment of a processing method for a structured/hierarchical content of the present invention includes: a target subtree setting step of setting a target subtree relating to a range including a target content portion as an extracted portion of the matching pattern in the structured/hierarchical content (hereinafter, referred to as a "target content") from which the matching pattern is to be extracted; an occurrence mode detecting step of detecting an occurrence mode of each node of the target subtree by selecting a plurality of past structured/hierarchical contents with respect to the target content and collating the target subtree relating to the target content with a tree relating to each of the past structured/hierarchical contents; a statistical information generating step of generating statistical information concerning an occurrence frequency of the occurrence mode of each node in the target subtree based on the plurality of past structured/hierarchical contents; a classifying step of performing classification of each node of the target subtree based on the statistical information and a result of detecting the occurrence mode; and a matching pattern generating step of generating the matching pattern for the target content portion based on the classification.

BRIEF DESCRIPTION OF THE DRAWINGS

For a more complete understanding of the present invention and the advantages thereof, reference is now made to the following description taken in conjunction with the accompanying drawings.

FIG. 13 is a view showing a first difference calculation example for a Web content of asahi.com.

FIG. 14 is a view showing a second difference calculation example for a Web content of asahi.com.

FIG. 15 is an example of a DOM tree.

FIG. 17 is a view showing the distance vectors at the respective stages in contrast.

FIG. 19 is a view showing a Web content having a listing pattern in which bullets are varied.

FIG. 20 is a view showing an image of News LYCOS as an example of a Web content including repetitions.

FIG. 21 is a view showing an image of a Web content of CNN.COM as an example of the Web content including the repetitions.

FIG. 22 is a view showing an image of a Web content in which ten or more tables are continuous in td.

FIG. 23 is a view showing an image of an INDEX page of asahi.com and a difference result thereof in contrast.

FIG. 24 is a view showing an image of a sports page of asahi.com.

FIG. 25 is a view showing a difference result based on the image of FIG. 24.

FIG. 28 is a view showing an anticipated screen of a site pattern analyzer (SPA2) for the free annotation.

FIG. 30 is a view showing a result of difference calculation processing for a predetermined region of a certain Web content with adjacent pages.

FIG. 31 is a utilization explanatory view of a matching pattern with regard to cutout of numerical values of stock prices from a Web content for stock price information.

FIG. 32 is a view showing an example of a Web content where predetermined stationary nodes move.

FIG. 33 is a view showing an example of a Web content to be used for partial cutout.

DETAILED DESCRIPTION OF THE INVENTION

Figure 1:
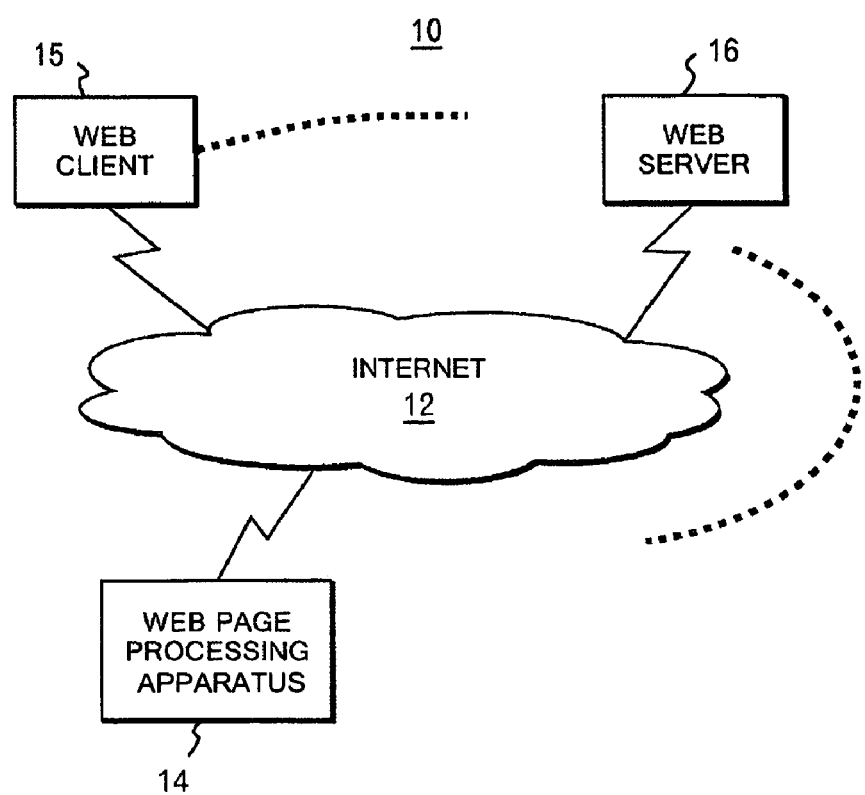
FIG. 1 is a constitutional view of a processing system 10 for a structured/hierarchical content, with which a Web content processing apparatus 14 is equipped.

The present invention provides apparatus, methods and programs, which exert a great effect when performing processing such as, for example, cutout of a part of structured/hierarchical contents delivered through a network and reuse of an annotation common thereto. The present invention also provides processing apparatus for a structured/hierarchical content, processing methods for the structured/hierarchical content and processing programs for the structured/hierarchical content. These are capable of attaining, for example, the cutout of the part of the structured/hierarchical contents and the reuse of the annotation common thereto without using an XPath and adding a tag.

In order to identify whether or not contents are the structured/hierarchical contents subjected to the processing such as the partial cutout of the contents and the reuse of the annotation common to a plurality of contents, not an XPath but a matching pattern is used.

Past and/or adjacent structured/hierarchical contents with respect to a target content are checked, and respective nodes are classified based on statistical information relating to occurrence modes of the nodes in a target subtree and occurrence frequencies of the occurrence modes, thus generating the matching pattern.

In an example of a processing apparatus for a structured/hierarchical content of the present invention, it is determined whether or not a structured/hierarchical content delivered through a network includes a content portion matched with a predetermined matching pattern, and if a result of the determination is positive, then predetermined processing is performed for the structured/hierarchical content. Moreover, the processing apparatus for a structured/hierarchical content includes: target subtree setting means for setting a target subtree relating to a range including a target content portion as an extracted portion of the matching pattern in the structured/hierarchical content (hereinafter, referred to as a "target content") from which the matching pattern is to be extracted; occurrence mode detecting means for detecting an occurrence mode of each node of the target subtree by selecting a plurality of past structured/hierarchical contents with respect to the target content and collating the target subtree relating to the target content with a tree relating to each of the past structured/hierarchical contents; statistical information generating means for generating statistical information concerning an occurrence frequency of the occurrence mode of each node in the target subtree based on the plurality of past structured/hierarchical contents; classifying means for performing classification of each node of the target subtree based on the statistical information and a result of detecting the occurrence mode; and matching pattern generating means for generating the matching pattern for the target content portion based on the classification.

In an example embodiment of a processing method for a structured/hierarchical content of the present invention, it is determined whether or not a structured/hierarchical content delivered through a network includes a content portion matched with a predetermined matching pattern, and if a result of the determination is positive, then predetermined processing is performed for the structured/hierarchical content. Moreover, the processing method for a structured/hierarchical content of the present invention includes: a target subtree setting step of setting a target subtree relating to a range including a target content portion as an extracted portion of the matching pattern in the structured/hierarchical content (hereinafter, referred to as a "target content") from which the matching pattern is to be extracted; an occurrence mode detecting step of detecting an occurrence mode of each node of the target subtree by selecting a plurality of past structured/hierarchical contents with respect to the target content and collating the target subtree relating to the target content with a tree relating to each of the past structured/hierarchical contents; a statistical information generating step of generating statistical information concerning an occurrence frequency of the occurrence mode of each node in the target subtree based on the plurality of past structured/hierarchical contents; a classifying step of performing classification of each node of the target subtree based on the statistical information and a result of detecting the occurrence mode; and a matching pattern generating step of generating the matching pattern for the target content portion based on the classification.

In place of the past structured/hierarchical contents, a plurality of adjacent structured/hierarchical contents can be utilized. The network includes an Intranet, an Extranet and the like as well as the Internet. The structured/hierarchical content is defined as a content including structure information and hierarchy information as well as content itself. As the structured/hierarchical content, for example, there are an XML document and a web page (HTML file).

A processing program for a structured/hierarchical content of the present invention allows a computer to execute the steps of the processing method for a structured/hierarchical content.

In order to determine whether or not a structured/hierarchical content to be determined is the structured/hierarchical content adjacent to the target content, analogousness in URL and/or layout is used as a determination factor. In a default state, a system determines overall analogousness while taking the analogousness in the both into consideration. Specifically, the system determines whether or not the structured/hierarchical content to be determined is the structured/hierarchical content adjacent to the target content. For the default as described above, an author can define specific analogousness. Specifically, based on the specific contents of the respective target contents, the author can define specific conditions of the URL and/or layout of the structured/hierarchical content to be determined. Here, the conditions are that the structured/hierarchical content is determined to be the structured/hierarchical content adjacent to the target content. Then, in place of the default, the author can instruct the specific conditions to the computer. The respective means (ex.: the occurrence mode detecting means and the statistical information generating means) and the respective steps (ex.: the occurrence mode detecting step and the statistical information generating step), which determine whether or not the structured/hierarchical content is the structured/hierarchical content adjacent to the target content, implement the determination based on the specific conditions.

The "adjacent structured/hierarchical content" can be defined as, though the URL thereof is different from that of the target content, (a) a structured/hierarchical content in which a URL is identical to the URL of the target content in a predetermined ratio or more and/or (b) a structured/hierarchical content in which at least a principal portion of a layout is identical to the layout of the target content. The structured/hierarchical content defined in (b) includes a structured/hierarchical content in which a layout has an identical region to that of the layout of the target content in a predetermined ratio or more.

The adjacent structured/hierarchical contents include at least ones listed in the following (a) and (b).

(a) Structured/hierarchical content of which directory is common to the target content. A specific example (asahi.com) in the case where the structured/hierarchical content is a Web content is shown as follows.

For example, the next URLs are listed as adjacent structured/hierarchical contents to a Web content as the target content of which URL is l asahi.com/0606/news/national06015
l asahi com/0606/news/national06012
l asahi.com/0606/news/national06013
l asahi.com/0606/news/national06014

(b) Structured/hierarchical contents in which directories on a predetermined number of hierarchies (for example, two hierarchies) are common to that of the target content. A specific example (cnn.com) in the case where the structured/hierarchical contents are Web contents is shown as follows.

For example, the next URLs are listed as adjacent structured/hierarchical contents to a Web content as the target content of which URL is l cnn.com/2000/US/06/05/ sea.based.defense/index.
cnn.com/2000/US/06/05/dday.remembrance/index.html
cnn.com/2000/US/06/05/helicopter.escape.03/index.
cnn.com/2000/US/06/05/curbing.terrorism.02/index.

A processing apparatus for a structured/hierarchical content automatically generates a matching pattern with high precision only by designating a region desired to be cut out as a method of cutting out a part of a Web page, and realizes robust cutout of an appropriate content. The generation of the matching pattern is performed based on a statistical difference of a Web page with a plurality of pages (hereinafter, a Web content will be referred to as a "page" according to needs). Designated regions (certain nodes on a DOM tree) are compared with a group of past pages stored in advance (subjected to a difference calculation), statistical quantities thereof are calculated, and the nodes are classified into stationary nodes, surely present nodes to be updated and nodes to be added/disappeared. Subtrees subjected to the processing such as detection of an iteration pattern after the classification of the nodes become the matching pattern of the annotation. When the past pages are not present, the matching pattern is obtained in a similar way by performing similar processing performed for adjacent pages. Unlike by the conventional method based on the XPath and the buried tag, the matching pattern as described above does not require changing an original content, and accurate cutout is enabled only by applying the matching pattern as an external annotation. Furthermore, the matching pattern is far more robust in that it is never affected by a change of an upper node even though the change occurs.

The "annotation" is defined as predetermined information added to a structured/hierarchical content B when the structured/hierarchical content B is prepared from a predetermined structured/hierarchical content A. This additional predetermined information includes (a) information designating a part of the content A, (b) information concerning portions designated in the content A and/or (c) information obtained by appropriately combining the above (a) and (b). Citing specific examples of the content B, a list summarizing the main items of the content A, which is displayed on the lower side of the content A that is on a screen display mode, and a list of various designation, which includes a change designation of a font size, are added to the content B that is on a screen display mode. The matters thus added are annotations. Upon clicking an item in the list of main items of the added portions, users can jump to a spot in the content B, which corresponds to the portion of the content A. In addition, upon clicking an item in the list of various designations, correspondence processing such as largely displaying fonts on the content B, which includes the portions of the content A, is performed. Note that the matching pattern can be made to function as the annotation by utilizing the matching pattern as information designating the part of the content A and by combining the matching pattern with additional information (information on role and importance of the relevant content portion).

FIG. 1 is a constitutional view of the processing system 10 for the structured/hierarchical content, with which the Web content processing apparatus 14 is equipped. A network, to which the present invention is applied, is not limited to the Internet 12 and may be an intranet, an Extranet and the like. The Web content processing apparatus 14, the Web clients 15 and the Web servers 16 are connected to the Internet 12 and are constructed to be capable of mutually transmitting and receiving data through the Internet 12. The one Web content processing apparatus 14 behaves as a processing apparatus for the structured/hierarchical content, and orders a Web content in accordance with the HTTP (HyperText Transfer Protocol) from corresponding one or a plurality of the Web servers 16 in response to requests from the plurality of Web clients 15. Then, for the Web content, the Web content processing apparatus 14 performs predetermined processing, for example, the impartation of the annotation and/or the cutout of the content, and transmits the processed Web content to the Web clients 15. Note that personal computers serving as the Web clients 15, which are actually operated by the users, may not be directly connected to the Internet 12. The personal computers may be directly connected to an in-company LAN and may be connected to the Internet 12 through a proxy server and a router on the LAN.

Figure 2:
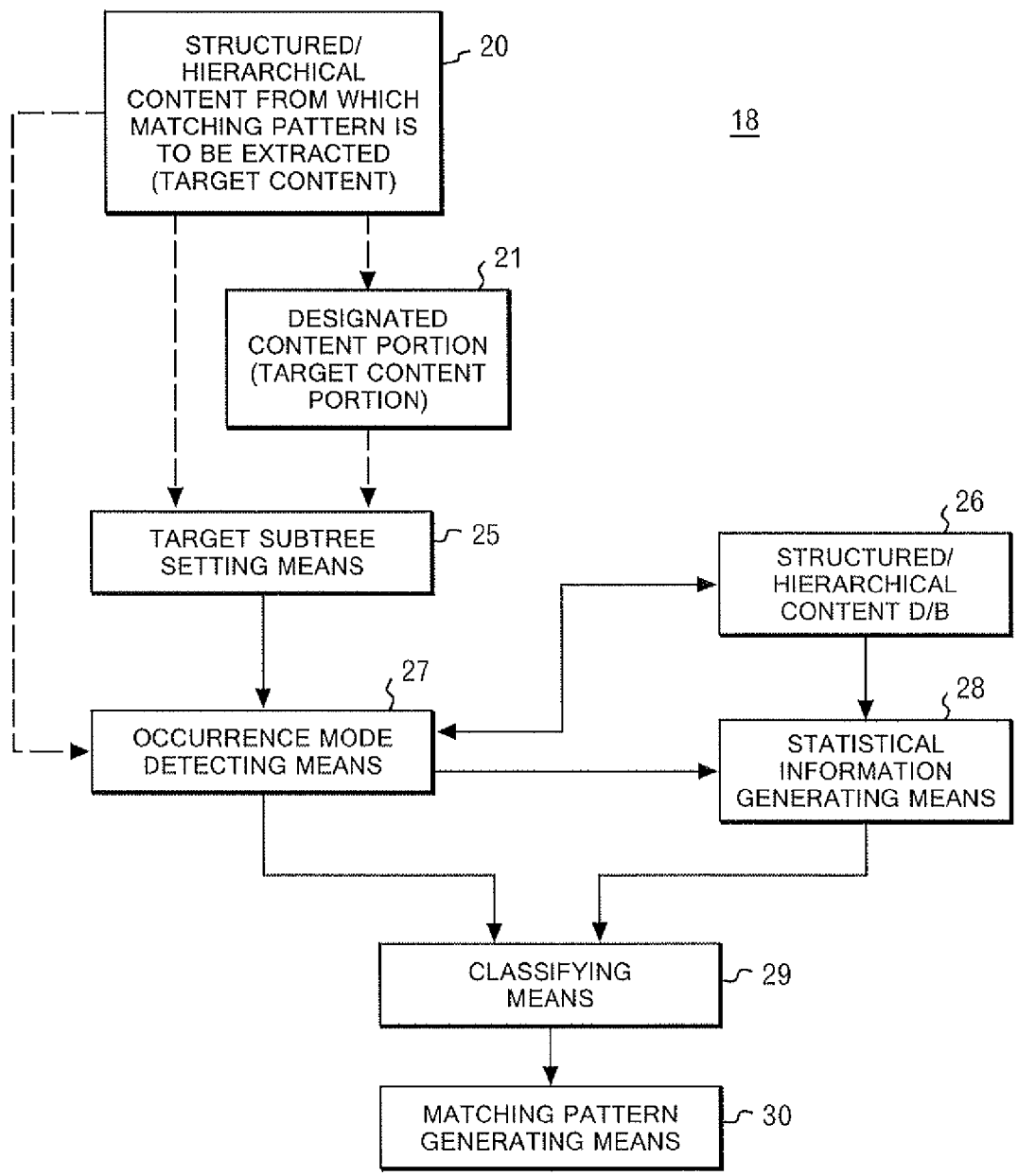
FIG. 2 is a block diagram of a processing apparatus 18 for the structured/hierarchical content.

FIG. 2 is a block diagram of the processing apparatus 18 for the structured/hierarchical content. When the structured/hierarchical content to be processed by the processing apparatus 18 are a Web content, the processing apparatus 18 becomes the Web content processing apparatus 14 of FIG. 1. An author of the processing apparatus 18 for the structured/hierarchical content prepares an annotation usable commonly to the plurality of structured/hierarchical contents (for example, Web contents), and cuts out predetermined content portions from one or a plurality of the structured/hierarchical contents. The "cutout" mentioned herein does not mean that the content portions are deleted from the structured/hierarchical contents from which the content portions are "cut out," and the relevant cut out portions remain in the structured/hierarchical contents from which the content portions are "cut out." Strictly speaking, the "cutout" mentioned herein is "copying." Then, the author conducts editorial work for the structured/hierarchical contents, such as preparation of new structured/hierarchical contents by pasting the one or plurality of cut out content portions. From a predetermined server of a structured/hierarchical content, the author reads the target content 20 as the structured/hierarchical content, from which the matching pattern is to be extracted, through the network. Then, the author designates a predetermined content portion from the target content 20. The content portion thus designated will be referred to the "target content portion 21." For the target content portion 21, the processing apparatus 18 for the structured/hierarchical content automatically sets, as a target subtree, a subtree relating to a range including the target content portion 21 on the DOM tree of the target content 20. The target subtree is required relating to the range including the target content portion 21. It is preferable to set the range at a range as small as possible, and the range may be set at a range of the content portion, which is somewhat larger than the target content portion 21. Prior to the editorial work at this time, the author notifies the XPath of the target content 20 to the structured/hierarchical content database 26 in advance (for example, one week before, 10 days before and one month before this editorial work). After the notification, the structured/hierarchical content database 26 automatically and periodically accesses contents relating to the target content 20, and stores the contents therein. Hence, in the case of this user's work for the target content 20, the sufficient number of past structured/hierarchical contents involved in the target content 20 are stored in the structured/hierarchical content database 26. The occurrence mode detecting means 27 reads out the past structured/hierarchical contents involved in the target content 20 from the structured/hierarchical content database 26 one by one or in a lump, collates the target subtree relating to the target content portion 21 with trees relating to the past structured/hierarchical contents, and detects the occurrence mode of the respective nodes of the target subtree. Preferably, the plurality of past structured hierarchical contents involved in the target content 20 are structured/hierarchical contents stored within a predetermined past period from the present point of time, that is, from the time of generation processing of the matching pattern. Note that the target content 20 and the past structured/hierarchical contents involved in the target content 20 have the same URL (Uniform Resource Locator). The statistical information generating means 28 generates statistical information concerning the occurrence frequencies of the occurrence modes of the respective nodes in the target subtree based on the plurality of past structured/hierarchical contents. The classifying means 29 classifies the respective nodes of the target subtree based on the result of detecting the occurrence modes in the occurrence mode detecting means 27 and the statistical information generated by the statistical information generating means 28.

The processing in the occurrence mode detecting means 27, the statistical information generating means 28 and the classifying means 29 will be described more specifically. In the occurrence mode detecting means 27, the target subtree relating to the target content 20 is collated with one tree of the past structured/hierarchical contents. Thus, the respective nodes of the target subtree can be classified into (N1) nodes that occur also in the structured/hierarchical contents and have the same contents as those of the structured/hierarchical contents, (N2) nodes that occur also in the structured/hierarchical contents but have different contents, and (N3) nodes that do not occur in the structured/hierarchical contents. Note that each content of the nodes means a description content between a start tag and an end tag in the XML as the structured/hierarchical content. The occurrence mode detecting means 27 collates the trees of the predetermined plural number of past structured/hierarchical contents with the target subtree, thus making it possible to detect the statistical information concerning the occurrence frequencies of (N1) and (N2). The statistical information generating means 28 generates this statistical information. The classifying means 29 has preset threshold values V1 and V2 for the frequencies at which the nodes occur in the modes of (N1) and (N2). Typically, V1 and V2 are equal to each other (V1=V2), however, V1 and V2 may be values different from each other. Typically, both of V1 and V2 are set equal to 70% (V1=V2=70%). A specific example of the node classification in the classifying means 29 is as follows. The nodes in the mode of (N1), of which occurrence frequencies are equal to/larger than V1 ($\geqq$V1), are classified into stationary nodes. The nodes in the mode of (N2), of which occurrence frequencies are equal to/larger than V2 ($\geqq$V2), are classified into updated nodes. Nodes that are not classified into either the stationary nodes or the updated nodes are classified into additional nodes.

The matching pattern generating means 30 generates the matching pattern based on the classification results in the classifying means 29. Matching processing between the matching pattern generated in the matching pattern generating means 30 and the content portion will be described later in detail with reference to FIG. 6.

Figure 3:
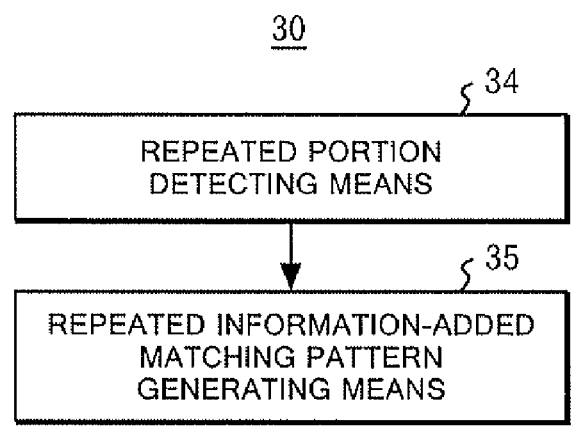
FIG. 3 is a more specific block diagram of matching pattern generating means 30.

FIG. 3 is a more specific block diagram of the matching pattern generating means 30. The repeated portion detecting means 34 detects repeated portions in the target subtree based on the classification into the stationary nodes, the updated nodes and the additional nodes. The repeated information-added matching pattern generating means 35 generates a matching pattern including presence information of the repeated portions. In such a way, even if the structured/hierarchical content determined whether it is matched with the generated matching pattern repeats the repeated portions arbitrary times, the matching pattern allows the structured/hierarchical content to be usable as one matched with the matching pattern.

Figure 4:
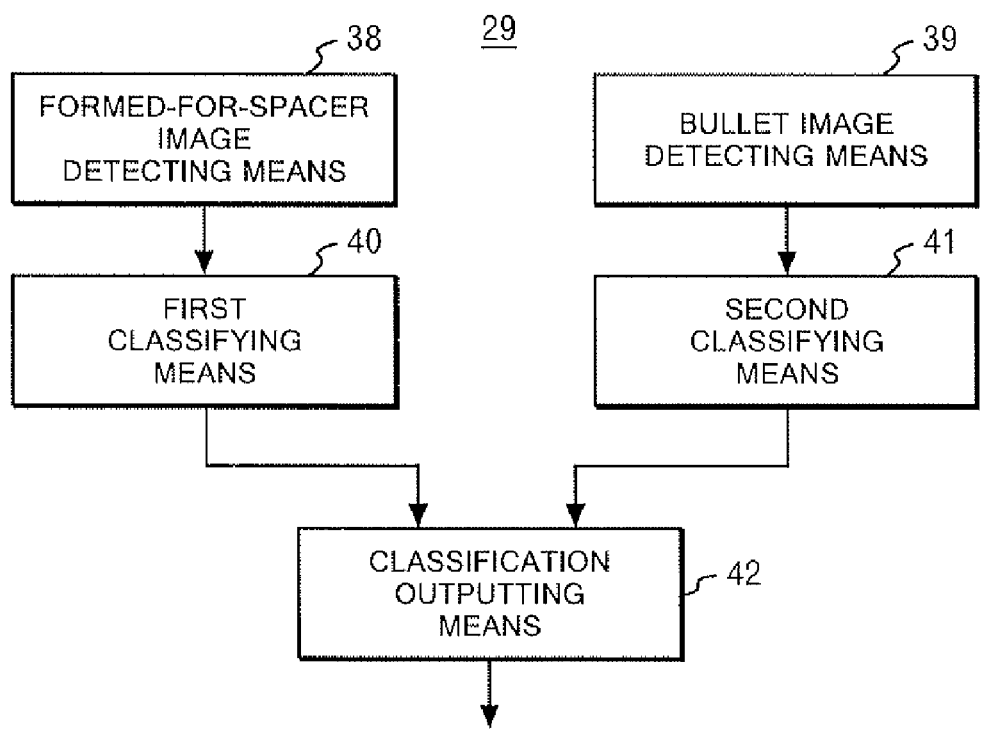
FIG. 4 is a more specific block diagram of classifying means 29.

FIG. 4 is a more specific block diagram of the classifying means 29. In order to improve a layout during display, the structured/hierarchical content sometimes includes an image for a spacer and a bullet image. The image for the spacer corresponds to a "spacer GIF" of an HTML file. The plurality of images are used for one structured/hierarchical content in order to secure a blank region, and designated sizes thereof are mutually different. Meanwhile, the bullet image corresponds to a "bullet image" of the HTML file. The plurality of bullet images are used for one structured/hierarchical content. Sizes thereof are designated to be identical, or no designation is made thereto. The formed-for-spacer image detecting means 38 detects whether or not the nodes of the target subtree are nodes relating to the images for the spacer. The bullet image detecting means 39 detects whether or not the nodes of the target subtree are nodes relating to the bullet images. The first classifying means 40 classifies the nodes relating to the images for the spacer into the additional nodes. The second classifying means 41 allocates the nodes relating to the bullet images to the same classification among those of the stationary nodes, updated nodes and additional nodes even if display contents thereof are mutually different. The classification outputting means 42 includes a function of summarizing the classifications of the nodes by the first and second classifying means 40 and 41, and generates the output of the classifying means 29.

The processing apparatus 18 for the structured/hierarchical contents of FIG. 2 generates the matching pattern based on the past structured/hierarchical contents (contents of which URLs are the same as that of the target content) with respect to the target content. However, the processing apparatus 18 can also generate the matching pattern based on the structured/hierarchical contents adjacent to the target content. The generation of the matching pattern based on the adjacent structured/hierarchical contents may be implemented (a) only when there are no past content portions with respect to the target content or (b) regardless of the existence of the past content portions with respect to the target content. For example, the business article page on the home page of Asahi Shimbun (www.asahi.com) includes a date in the URL as follows, and can be browsed together with up-to-date business articles for a predetermined period including the present. Note that, in the example below, the business article is dated as of October 19.

In order to generate an appropriate matching pattern even in the case as described above, the present invention introduces a concept titled "adjacent structured/hierarchical contents to a target content." The adjacent structured/hierarchical contents are structured/hierarchical contents, which have URLs analogous to that of the target content and are made to belong to the same group as that of the target content in the case of a matching determination by means of the matching pattern. The analogous range of the URLs is varied depending on the extent to which the author determines that differences of the structured/hierarchical contents are allowable and the different contents belong to the same group. The URLs include directories (portions partitioned by forward slashes in the example of the business article in Asahi Shimbun) in the respective hierarchies. When the URLs of the contents to be determined whether or not they are the adjacent structured/hierarchical contents are collated with the URL of the target content, if directories up to a predetermined number (one or more) of hierarchies from the uppermost hierarchy are identical and only directories in lower hierarchies from the hierarchies where the directories are identical, the content portions subjected to the determination may be determined as adjacent content portions. Specific examples of the adjacent content portions are listed as follows. In the next cases, the structured/hierarchical contents subjected to the determination are determined as the adjacent structured/hierarchical contents.

(a) Only a portion recognized as a date in the URL differs from that of the target content. In the above-described example of the business article of Asahi Shimbun, the relevant portion is "1019."(b) Only a portion used as numbering in the URL differs from that of the target content. In the above-described example of the bisiness article of asahi shimbun, the relevant portion is "002.html."(c) Only the above-described (a) and (b) differ from those of the target content.

(a) Only a portion recognized as a date in the URL differs From that of the target content. In the above-description Example of the business article of Asahi Shimbun, the Relevent portion is "1019."

(b) only aportion used as numbering in the URL differs from That of the target content. In the above-described example of the business article of Asahi Shimbun, the relevant portion is "002.html."

(c) Only the above-described (a) and (b) differ from those of the target content.

In the case where the processing apparatus 18 for the structured/hierarchical contents of FIG. 2 generates the matching pattern based on the adjacent structured/hierarchical contents in place of the past structured/hierarchical contents, only a different point from the case where the processing apparatus 18 generates the matching pattern based on the past structured/hierarchical contents will be described. The structured/hierarchical content database 26 stores the plurality of structured/hierarchical contents adjacent to a predetermined structured/hierarchical content in advance in order to cope with a selection of an arbitrary structured/hierarchical content as the target content 20 of this time by the author. The occurrence mode detecting means 27 reads out the structured/hierarchical contents adjacent to the target content 20 one by one or in a lump from the structured/hierarchical content database 26, collates the target subtree relating to the target content 29 with the trees relating to the respective structured/hierarchical contents adjacent to the target subtree relating to the target content 20, and detects the occurrence modes of the respective nodes of the target subtree. The statistical information generating means 28 generates the statistical information concerning the occurrence frequencies of the occurrence modes of the respective nodes of the target subtree based on the plurality of adjacent structured/hierarchical contents. The classifying means 29 classifies the nodes of the target subtree based on the result of detecting the occurrence modes in the occurrence mode detecting means 27 and the statistical information generated by the statistical information generating means 28. In the case of using the adjacent structured/hierarchical contents in place of the past structured/hierarchical contents, the processing in the occurrence mode detecting means 27, the statistical information generating means 28 and the classifying means 29 will be described as follows. In the occurrence mode detecting means 27, the target subtree relating to the target content 20 is collated with the tree of one adjacent structured/hierarchical content. Thus, the respective nodes of the target subtree can be classified into (N1) nodes that occur also in the structured/hierarchical contents and have the same contents as those of the structured/hierarchical contents, (N2) nodes that occur also in the structured/hierarchical contents but have different contents, and (N3) nodes that do not occur in the structured/hierarchical contents. The occurrence mode detecting means 27 collates the tree of each of the predetermined plural adjacent structured/hierarchical contents with the target subtree, thus making it possible to detect the statistical information concerning the occurrence modes of (N1) and (N2) for each node of the target subtree.

The statistical information generating means 28 generates this statistical information. The classifying means 29 has preset threshold values V1 and V2 for the frequencies at which the nodes occur in the modes of (N1) and (N2). Typically, V1 and V2 are equal to each other (V1=V2), however, V1 and V2 may be values different from each other. Typically, both of V1 and V2 are set equal to 70% (V1=V2=70%). A specific example of the node classification in the classifying means 29 is as follows. The nodes in the mode of (N1), of which occurrence frequencies are equal to/larger than V1 ($\geqq$V1), are classified into the stationary nodes. The nodes in the mode of (N2), of which occurrence frequencies are equal to/larger than V2 ($\geqq$V2), are classified into the updated nodes. Nodes that are not classified into either the stationary nodes or the updated nodes are classified into the additional nodes.

Note that the matching pattern generating means 30 of FIG. 3 and the classifying means 29 of FIG. 4 are also applied in the case of generating the matching pattern based on the adjacent structured/hierarchical contents in place of the past structured/hierarchical contents.

Figure 5:
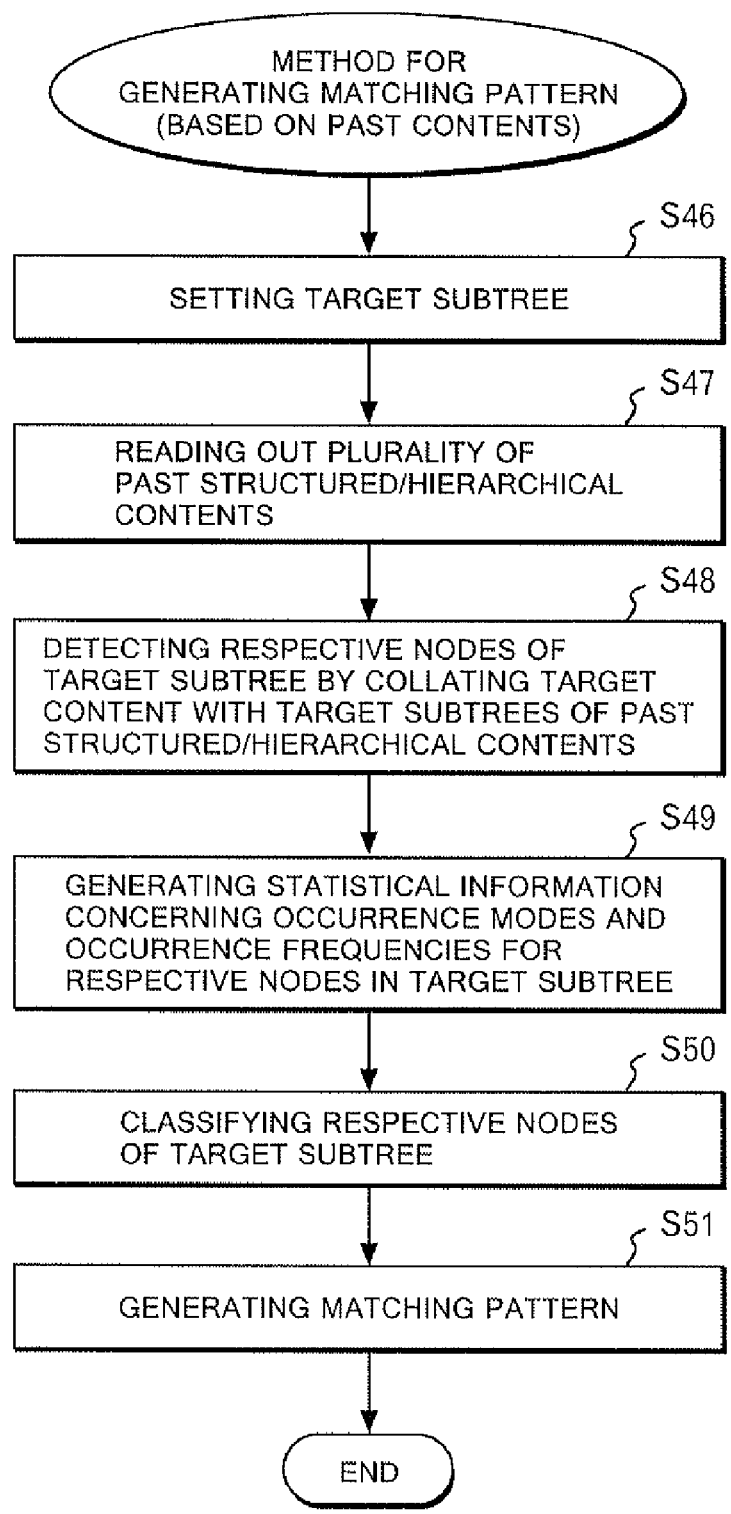
FIG. 5 is a flowchart of a method for generating a matching pattern based on past structured/hierarchical contents.

FIG. 5 is a flowchart of a method for generating the matching pattern based on the past structured/hierarchical contents. The agent of the respective steps of the matching pattern generation method is a computer installed with a program for executing the respective steps of the matching pattern generation method. This computer corresponds to the Web content processing apparatus 14 in the example of FIG. 1. In S46, the target subtree is set. From a predetermined structured/hierarchical content server, the author reads the target content 20 as the structured/hierarchical contents, from which the matching pattern is to be extracted, through the network. Next, the author designates a predetermined content portion from the target content 20. In S46, for the target content portion 21, a subtree including the range of the target content portion 21 is automatically set as a target subtree on the DOM tree of the target content 20. The target subtree is required relating to the range including the target content portion 21. It is preferable to set the range at a range as small as possible, and the range may be set at a range of the content portion, which is somewhat larger than the target content portion 21. In S47, the past structured/hierarchical contents with respect to the target content portion 20 are read out one by one or in a lump from the structured/hierarchical content database 26. In S48, the target subtree relating to the target content 20 is collated with the trees relating to the past structured/hierarchical contents, and thus the occurrence modes of the respective nodes of the target subtree are detected. Preferably, the plurality of past structured/hierarchical contents with respect to the target content 20 are structured/hierarchical contents within a predetermined past period from the present point of time, that is, from the time of generation processing of the matching pattern. Note that the target content 20 and the past structured/hierarchical contents with respect to the target content 20 have the same URL (Uniform Resource Locator). In S49, the statistical information concerning the occurrence frequencies of the occurrence modes of the respective nodes in the target subtree is generated based on the plurality of past structured/hierarchical contents. In S50, the respective nodes of the target subtree are classified based on the result of detecting the occurrence modes in the occurrence mode detecting means 27 and the statistical information generated by the statistical information generating means 28.

The processing in S48, S49 and S50 will be described more specifically. In S48, the target subtree relating to the target content 20 is collated with one tree of the past structured/hierarchical contents. Thus, the respective nodes of the target subtree can be classified into (N1) the nodes that occur also in the structured/hierarchical contents and have the same contents as those of the structured/hierarchical contents, (N2) the nodes that occur also in the structured/hierarchical contents but have different contents, and (N3) the nodes that do not occur in the structured/hierarchical contents. In S48, the tree of each of the predetermined plural number of past structured/hierarchical contents is collated with the target subtree, thus making it possible to detect the statistical information concerning the occurrence frequencies of (N1) and (N2) for each node of the target subtree. In S50, the preset threshold values V1 and V2 for the frequencies at which the nodes occur in the modes of (N1) and (N2) are provided. Typically, V1 and V2 are equal to each other (V1=V2), however, V1 and V2 may be values different from each other. Typically, both of V1 and V2 are set equal to 70% (V1=V2=70%). A specific example of the node classification in S50 is as follows. The nodes in the mode of (N1), of which occurrence frequencies are equal to/larger than V1 ($\geqq$V1), are classified into the stationary nodes. The nodes in the mode of (N2), of which occurrence frequencies are equal to/larger than V2 ($\geqq$V2), are classified into the updated nodes. The nodes that are not classified into either the stationary nodes or the updated nodes are classified into additional nodes.

Figure 6:
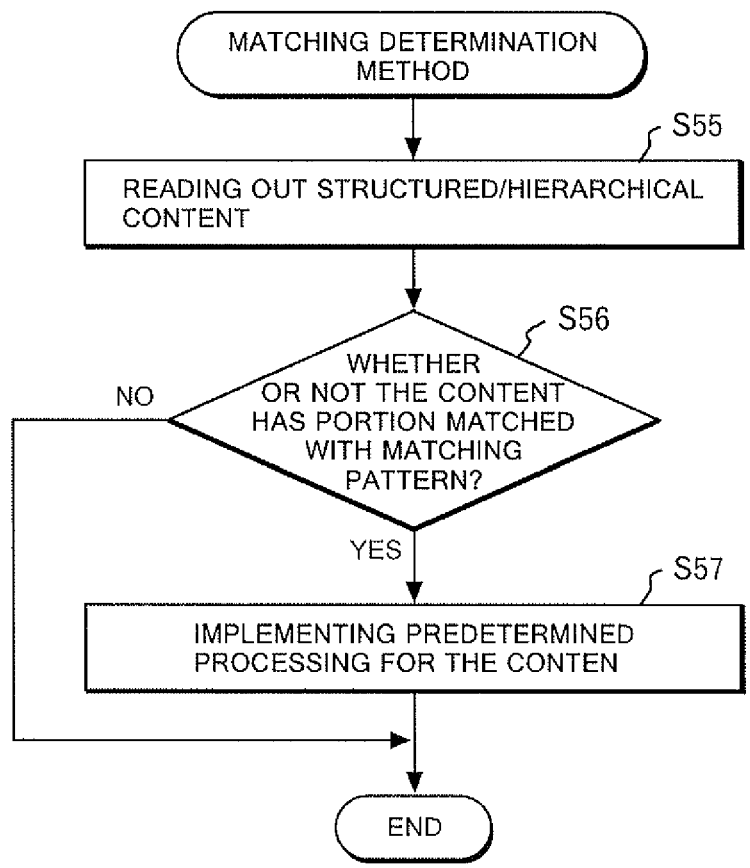
FIG. 6 is a flowchart of a matching determination method using the matching pattern generated according to the matching pattern generation method of FIG. 5.

In S51, the matching pattern is generated based on the classification result in S50. FIG. 6 is a flowchart of a matching determination method using the matching pattern generated according to the matching pattern generation method of FIG. 5. In S55, a content portion (hereinafter, referred to as a "determined content portion") to be determined from now on whether it is matched with the matching pattern is read out. In S56, it is determined whether or not the determined content portion has a portion matched with the matching pattern. The determined content portion when being determined to be matched with the matching pattern may be located at an arbitrary position in a structured/hierarchical content (hereinafter, referred to as a "determined content") including the relevant determined content portion. Specifically, the determined content portion matched with the matching pattern is correctly determined to be matched with the matching pattern even if the determined content portion is located at the arbitrary position of the determined content. If a result of the determination in S56 is positive, then the processing proceeds to S57, and otherwise, this method is ended. In S57, predetermined processing is implemented for the determined content portion. For example, the predetermined processing is (a) association of related information with a content portion of a determined content and (b) copy processing for a determined content portion of a determined content in order to utilize the content portion of the determined content for another structured/hierarchical content (those skilled in the art call the processing "cutout"). The related information of (a) is, for example, an annotation.

Figure 7:
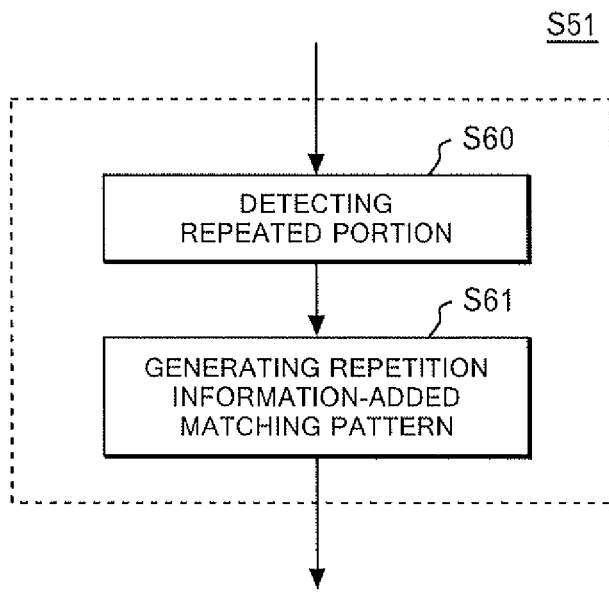
FIG. 7 is a flowchart portion showing a matching pattern generation step (S51) of FIG. 5 more specifically.

FIG. 7 is a flowchart portion showing the matching pattern generation step (S51) of FIG. 5 more specifically. In S60, the repeated portions in the target subtree are detected based on the classification into the stationary nodes, the updated nodes and the additional nodes. In S61, a matching pattern including presence information of the repeated portions detected in S60 is generated. In such a way, even if the structured/hierarchical content determined whether it is matched with the generated matching pattern has portions repeated arbitrary times, the generated matching pattern allows the structured/hierarchical content to be usable as one matched with the matching pattern.

Figure 8:
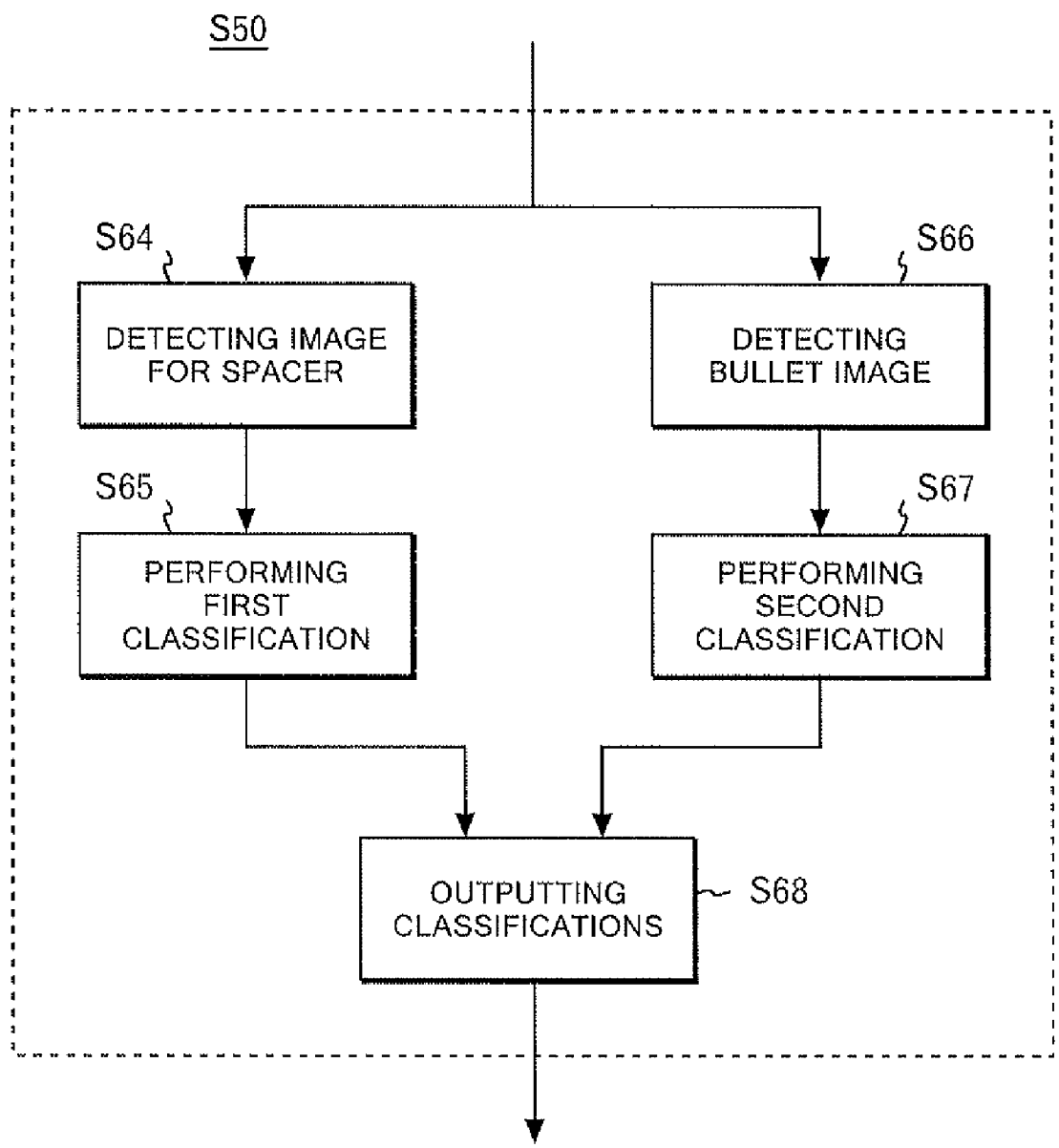
FIG. 8 is a more specific block diagram of the classifying means 29.

FIG. 8 is a more specific block diagram of the classifying means 29. In FIG. 8, the series of S64 and S65 and the series of S66 and S67 are illustrated so as to be processed in parallel. However, these series may be serially processed such that one of the series precedes the other. In S64, it is detected whether or not the nodes of the target subtree are nodes relating to the images for the spacer. In S65, the nodes relating to the images for the spacer are classified into the additional nodes. In S66, it is detected whether or not the nodes of the target subtree are nodes relating to the bullet images. In S67, the nodes relating to the bullet images are allocated to the same classification among those of the stationary nodes, updated nodes and additional nodes even if the bullet images display different contents. In S68, the classification results in S65 and S67 are summarized and outputted.

Figure 9:
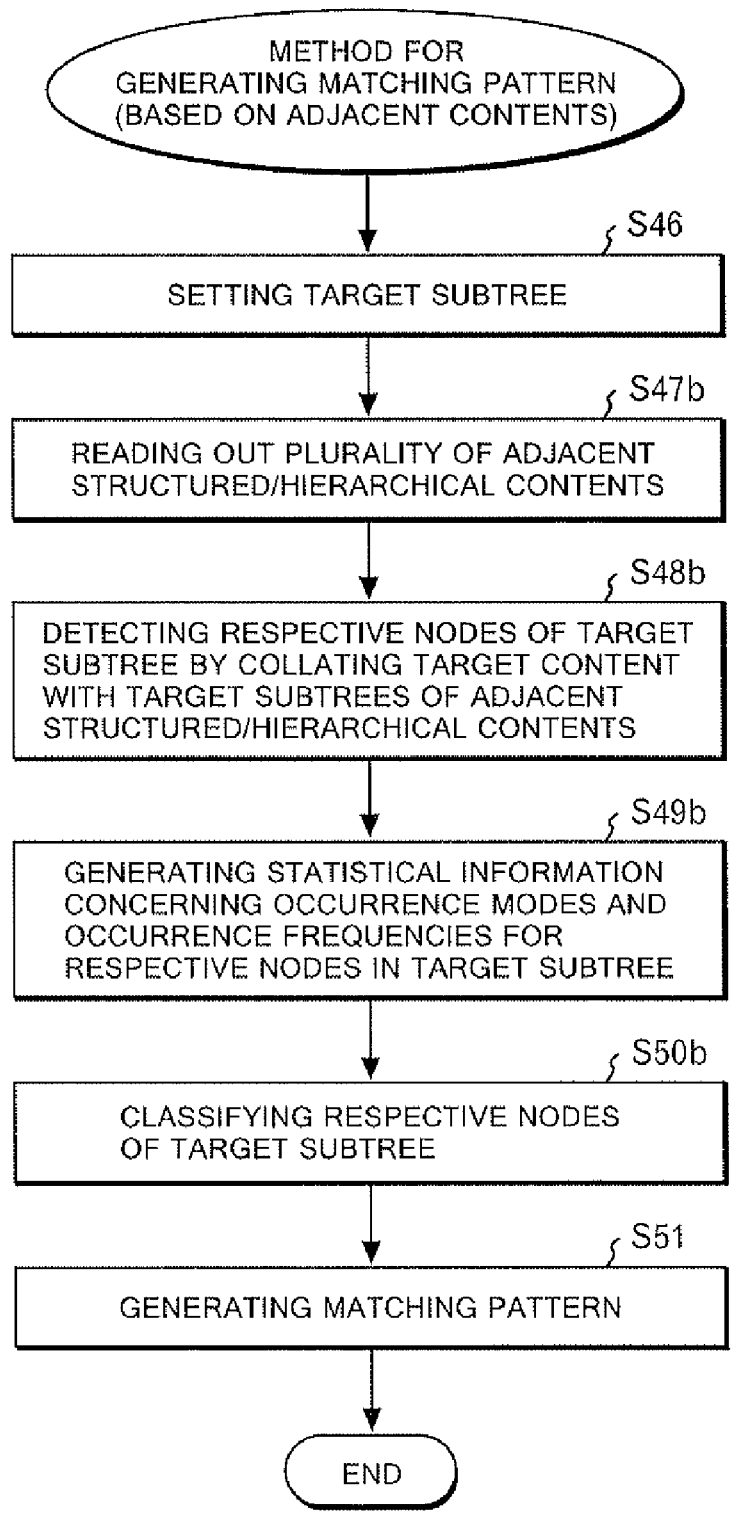
FIG. 9 is a flowchart of a method for generating the matching pattern based on a plurality of structured/hierarchical contents adjacent to a target content.

FIG. 9 is a flowchart of a method for generating the matching pattern based on the plurality of structured/hierarchical contents adjacent to the target content. With reference to FIG. 5, the method for generating the matching pattern based on the past structured/hierarchical contents with respect to the target content has been described. Meanwhile, the generation method described with reference to FIG. 9 may be implemented (a) only when there are no past content portions with respect to the target content or (b) regardless of the existence of the past content portions with respect to the target content. A different point of the flowchart of FIG. 9 from the flowchart of FIG. 5 is that S47b to S50b are implemented in place of S47 to S50. Only the different point will be described below.

In S47b, the structured/hierarchical contents adjacent to the target content 20 are read out one by one or in a lump from the structured/hierarchical content database 26. In S48b, the target subtree relating to the target content 20 is collated with the trees relating to the structured/hierarchical contents adjacent the target subtree, and the occurrence modes of the respective nodes of the target subtree are detected. In S49b, the statistical information concerning the occurrence frequencies of the occurrence modes of the respective nodes in the target subtree is generated based on the plurality of adjacent structured/hierarchical contents. In S50b, the respective nodes of the target subtree are classified based on the result of detecting the occurrence modes in the occurrence mode detecting means 27 and the statistical information generated by the statistical information generating means 28. The processing in S48b, S49b and S50b will be described more specifically. In S48b, the target subtree relating to the target content 20 is collated with the tree of one adjacent structured/hierarchical content. Thus, the respective nodes of the target subtree can be classified into the (N1) nodes that occur also in the structured/hierarchical contents and have the same contents as those of the structured/hierarchical contents, the (N2) nodes that occur also in the structured/hierarchical contents but have different contents, and the (N3) nodes that do not occur in the structured/hierarchical contents. In S48b, the tree of each of the predetermined plural adjacent structured/hierarchical contents is collated with the target subtree, thus making it possible to detect the statistical information concerning the occurrence modes of (N1) and (N2) for each node of the target subtree. In S49b, this statistical information is generated. In S50b, the threshold values V1 and V2 preset for the frequencies at which the nodes occur in the modes of (N1) and (N2) are acquired. Typically, V1 and V2 are equal to each other (V1=V2), however, V1 and V2 may be values different from each other. Typically, both of V1 and V2 are set equal to 70% (V1=V2=70%). A specific example of the node classification in S50b is as follows. The nodes in the mode of (N1), of which occurrence frequencies are equal to/larger than V1 ($\geqq$V1), are classified into the stationary nodes. The nodes in the mode of (N2), of which occurrence frequencies are equal to/larger than V2 ($\geqq$V2), are classified into the updated nodes. Nodes that are not classified into either the stationary nodes or the updated nodes are classified into the additional nodes. In S51, the matching pattern is generated based on the classification result in S50.

Note that the flowcharts of FIGS. 7 and 8 are also applied in the case of generating the matching pattern based on the adjacent structured/hierarchical contents in place of the past structured/hierarchical contents.

EXAMPLE

Figure 10:
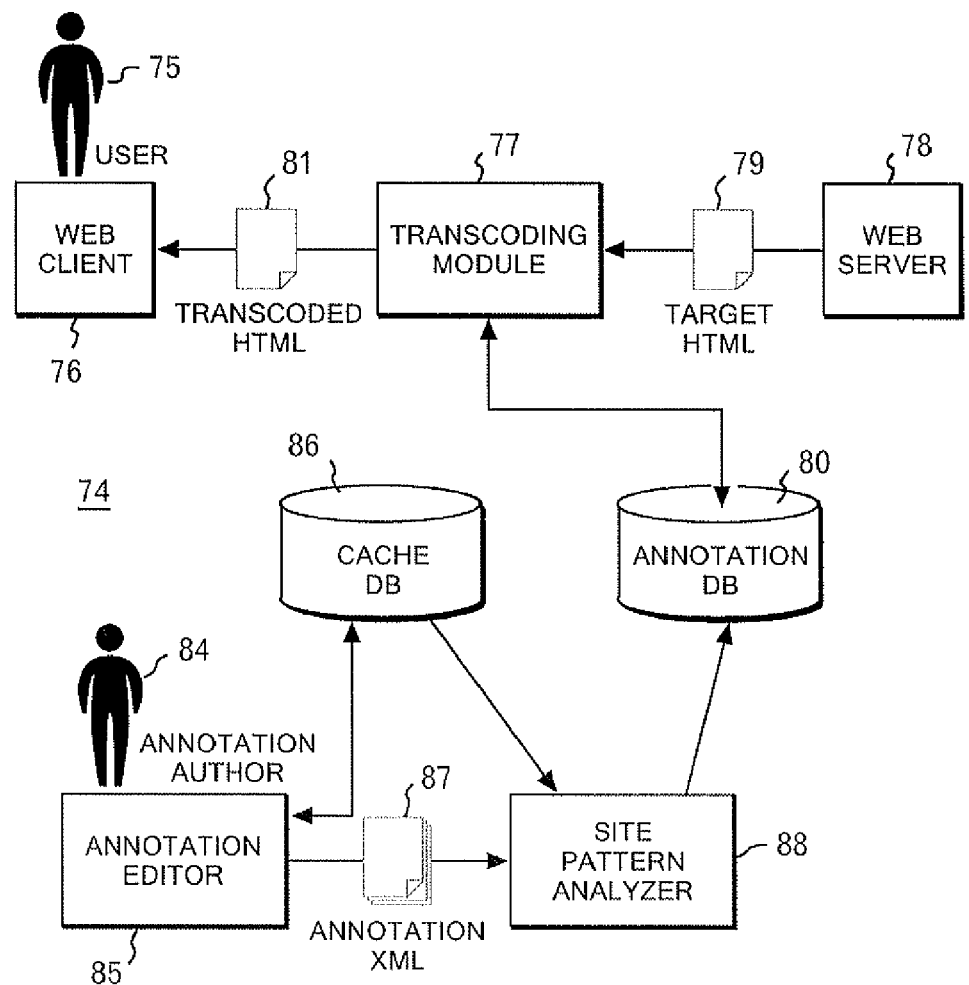
FIG. 10 is a constitutional view of a processing apparatus 74 for the Web content.

In Example, a Web content is selected as the structured/hierarchical content. A matching pattern of a content statistically calculated by use of a result of a difference calculation between a past page and an adjacent page is used for specifying a cutout portion. FIG. 10 is a constitutional view of the processing apparatus 74 for the Web content. The Web client 76, the transcoding module 77 and the Web server 78 are connected to the Internet and constructed to be capable of mutually transmitting and receiving data. The user 75 operates the Web client 76 and requests the transcoding module 77 to send the transcoded HTML 81 thereto. Upon receiving the request from the Web client 76, the transcoding module 77 receives the target HTML 79 from the corresponding Web server 78, transcodes the target HTML 79 based on an annotation from the annotation database, and sends the transcoded HTML 81 to the Web client 76. Note that, though the annotation database is typically equipped in a computer packaged with the transcoding module 77, the annotation database may be located at a separate place from the transcoding module 77 and may be connected to the transcoding module 77 through the Internet. The annotation editor 85, the cache database 86 and the site pattern analyzer 88 are packaged or equipped in the computer equipped with the annotation database. The cache database 86 is equipped with a mechanism of caching calculation algorithms of adjacent pages and past pages in plural versions and with a function of acquiring a page of a designated URL by periodically touring the page. The cache database 86 prepares an annotation of each target HTML 79 by use of the annotation editor 85. In order to improve the work efficiency of the annotation author 84, reuse of the annotation, in which the same annotation is commonly used for the plurality of target HTMLs 79, is performed. In order to achieve appropriate reuse of the annotation, a plurality of similar target HTMLs 79 are collected into one group, and the same annotation set is used for each group. Note that the annotation set is one formed by collecting the plurality of annotations. Whether or not the target HTMLs 79 belong to a predetermined group is determined by collating the target HTMLs 79 with a predetermined matching pattern.

The matching pattern can be used for the purpose of realizing an "annotation matched with a content though the annotation may occur in any portion in the page." Thus, robust cutout against a change of a layout can be realized. In the following, a method for automatically generating the matching pattern by differences with the adjacent pages and the past pages, which is a basic method, will be first described. Then, an example on an actual user interface will be described.

[Occurrence Frequency Calculation in Past Page Based on Difference Calculation]

Figure 11:
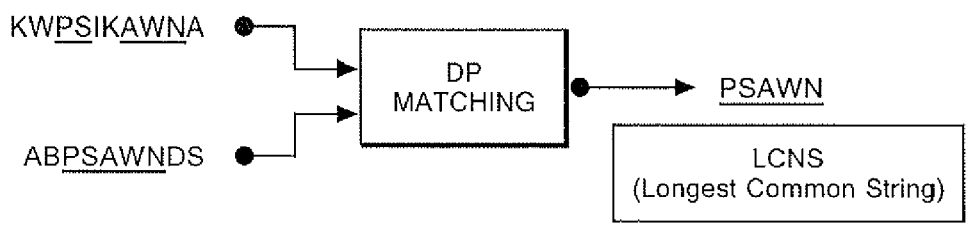
FIG. 11 is a schematic explanatory view of DP matching.

As a premise, the difference calculation used herein is one equivalent to that used in the simplification by the difference calculation. Even by using an algorithm performing a strict difference calculation of an XML, such as XMLDiff, the method in this example is executable. Here, as shown in FIG. 11, a method is used, which calculates a longest common node string (LCNS) by use of DP matching after once DOM trees are serialized. Although this method cannot perform an accurate difference calculation for the tree, this method is suitable for the method in this example because it has already confirmed that no practical problem is involved therein, the calculation is fast, it is easy to control an element to be calculated, and so on. Description will be made below on the assumption that this method is used for the difference calculation. In addition, in many processing steps that follow, "common nodes" are used as a result of the difference calculation. The "common nodes" are a group of nodes common to two DOM trees and can be obtained by selecting portions other than the differences from the difference calculation result. In the difference calculation method by the DP matching, which is used this time, common portions can be obtained as the LCNS halfway during the calculation. Therefore, the common nodes can be obtained without actually calculating difference portions. Accordingly, though the difference calculation is not actually conducted halfway of the entire calculation, the method in this example can be generally grasped as a variation of the difference calculation. Therefore, in the following description, the notation "difference calculation" is used. Strictly, a "group of common nodes (LCNS) as a result of the difference calculation" is used.

FIG. 11 is a schematic explanatory view of DP matching. For example, the first and second inputs are defined as "KWPSIKAWNA" and "ABPSAWNDS," respectively. By the DP matching, "PSAWN" as a longest common node string (LCNS) of these inputs is outputted. In the DP matching, even if excessive elements ("IK" of the first input in the example) are interposed in the DOM tree, if relative orders of the elements are identical, then a string formed of these elements can be extracted as the LCNS.

Figure 12:
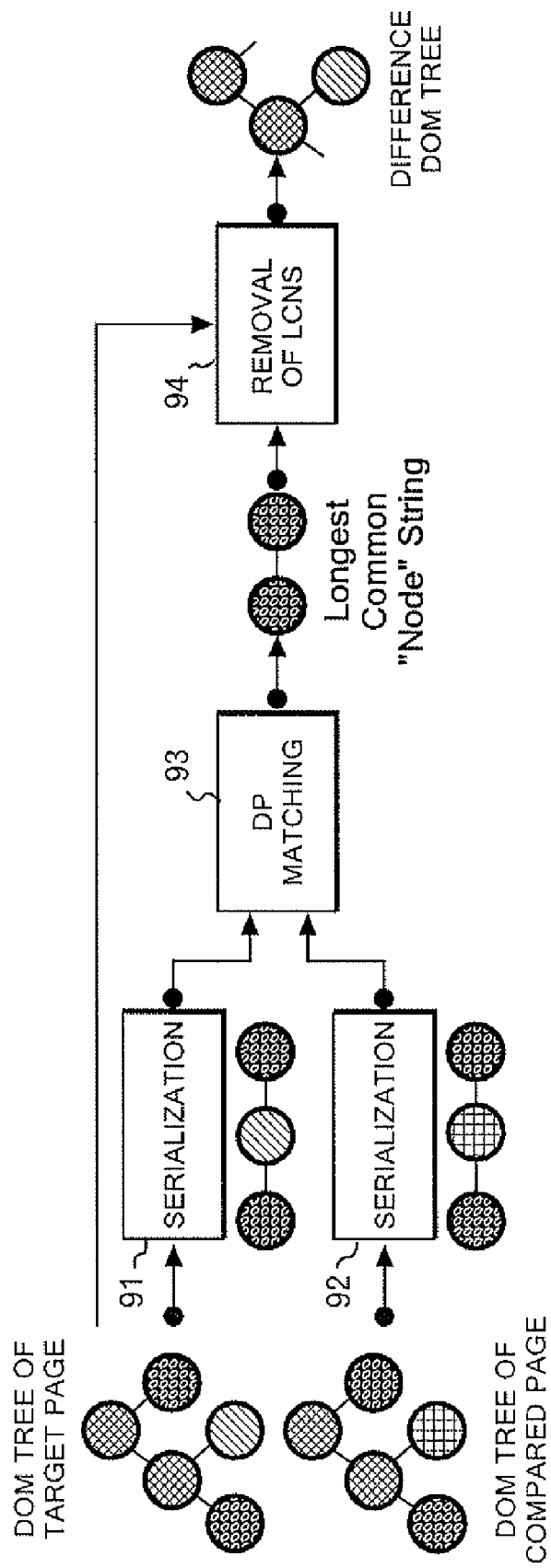
FIG. 12 is a schematic explanatory view in which the DP matching is applied to a difference calculation.

FIG. 12 is a schematic explanatory view in which the DP matching is applied to the difference calculation. The target portions of the DOM trees of the target page and the compared page (past page or adjacent page) are inputted to the serializing means 91 and 92, respectively, and arrangements thereof are converted from a tree type to a serial type. The DP matching means 93 calculates the longest common node string (LCNS) based on inputs from the serializing means 91 and 92. The LCNS removing means 94 as differentiating means outputs the difference DOM tree as a value obtained by subtracting the LCNS from the DOM tree of the target page.

Type A: Calculation of Matching Pattern in Case where Past Page is Present

A state is considered, where an annotation author has already designated a certain node group on a DOM tree by use of an annotation editor.

Step 1: A target subtree is decided. One ancestor node commonly owned by a group of subject nodes is searched. A <body> node is commonly owned in any case, and therefore, it is obvious that the node as described above is essentially present.

Step 2: A list of the past pages is acquired from a cache. It is desirable that the annotation author stores the past pages during the period spanning from several days to several weeks in advance. As the numbers of the past pages are more, it is possible to generate a more robust pattern.

Step 3: Difference calculations between the past pages and a page becoming a target at present are performed (difference calculations for the first time). In the case of performing serialization for the difference calculations, the entire elements in the designated group are added to the subject of serialization. Node rows selected by the DP matching are only "stationary nodes." "In the case where important attributes regarding appearance and function coincide" in checking identifications of tags, the tags are determined to be the same. This is because there is a possibility that a page author adds attributes different in detailed points to tags having the same appearance and functions. In the implementation of this example, the identifications were determined by attributes to be described below. Depending on subjects, for example, in the case where an src tag of img is completely controlled by a load balancing system of Akamai Technologies, Inc. or the like, the src tag will not be subjected to the identification determination.

l Base: "class," "id," "name," "style," "width," "height,""bgcolor"

l img series: "alt," "src"

l link series: "href"

l form series: "action," "method," "type," "value"

l table series: "align," "valign," "rowspan," "colspan," "size," "color," "face"

In the above, the "attribute regarding the appearance" is one regarding an appearance of an HTML file in a displayed state, such as "bgcolor." The "attribute regarding the function" is one that does not affect the displayed state of the HTML file, such as "href" of the link series, and "action" and "method" of the form series.

Step 4: A frequency at which each node in the tree of the target group occurs in the past pages is calculated as a "stationary index." For example, now, in the case where the target group is compared with twelve past pages and a certain element occurs in eight pages thereof, the stationary index becomes 0.67 (=8/12). Not only such a simple percentage but also any number can become an index as long as it is a numerical value indicating the frequency.

Step 5: Nodes determined not to be the stationary nodes are classified into "essential/updated nodes" (essentially occurring and being updated) and "additional nodes" (that may be added/deleted to be varied) by a difference calculation for the second time. The "essential/updated nodes" will be abbreviated as "updated nodes" in this specification according to needs. In Step 3, only in the case where the character string is completely matched with the text node, both were defined as identical. In this step, in "the case where a text node (image element) is present" even if a character string or an image is not matched therewith, both are determined to be identical. Moreover, anchor (a) elements of the both are determined to be identical even if the href attributes do not coincide with each other. ones having the src attribute such as iframe and the href attribute are processed in a similar way. Nodes that are not included in the node list of Step 2 but included in a node list in this step can be said to be "nodes that essentially occur and are always updated (text, anchor, image)."

Step 6: The frequency of each node listed up in Step 5 is calculated. This index is similar to that in Step 3, and a simple percentage can also be used therefor.

Step 7: The respective nodes are classified into the stationary nodes, the updated nodes and the additional nodes based on the results of Steps 4 and 6. Such classification is performed by determining the index by means of a certain threshold value. For example, when the stationary index exceeds 70%, the node is determined to be a stationary node. However, among the target subtrees subjected to the calculation in Step 1, in all of node groups that are not designated by the annotation author (node groups that are not included in subtrees extended to leaf directions with the subject node group in Step 1 as a root node), "any" is set in "pat: type attribute."

The results of the difference calculations as described above are shown in FIGS. 13 and 14. FIGS. 13 and 14 show examples of difference calculations for Web contents of asahi.com. FIGS. 13(a) and 14(a) shown originals (original content portions, and FIGS. 13(b) and 14(b) show results of the difference calculations. Colored background portions in FIGS. 13(b) and 14(b) are portions of stationary nodes, and white background portions are portions of updated text nodes. It is understood that the character string of "zenbun (full text)>>" in FIG. 13 and the character string of "saishinnyu-su (up-to-date news) can be determined to be regular.

Step 8: Furthermore, types of images are determined in order to improve precision. This is performed for the purpose of determining bullets in the list and "spacer GIFs" for securing blank regions and rejecting bullets and spacer GIFs from the iteration patterns. The plurality of spacer GIFs are used for one page, and are images different in designated size for each time when being used. The plurality of bullet images are used for one page, and are images always used in the same size or without designation of its size. Next, the iteration of the subtree in the pattern is analyzed. Some methods are present for analyzing the iteration pattern of the subtrees, and here, an algorithm is shown, where the detection of the iteration pattern is performed at a relatively high speed by searching a vector obtained by serializing the subtrees.

Step 9: The classified tree structures are serialized, the following information is calculated for each node, and thus a new vector is generated.

Distance vector: distance on a vector where subtrees which occur next and have "the same level, the same tag type and the same value node" are serialized.

For example, an example as below is considered. Here, the updated node is written as: pat:type="updated," and the additional node is written as: "pat:type="inserted"

```
<div>
    <ul>
        <li><pat:text pat:type="updated"/></li>
        <li><pat:text pat:type="updated"/></li>
        <li><pat:text pat:type="updated"/>
            <imag src=". . . /new. gif" pat:type="inserted">
        </li>
    </ul>
    <ul>
        <li><pat:text pat:type="updated"/></li>
        <li><pat:text pat:type="updated"/></li>
        <li><pat:text pat:type="updated"/></li>
    </ul>
    <ul>
        <li><pat:text pat:type="updated"/></li>
        <li><pat:text pat:type="updated"/></li>
        <li><pat:text pat:type="updated"/></li>
    </ul>
</div>
```

Figure 16:
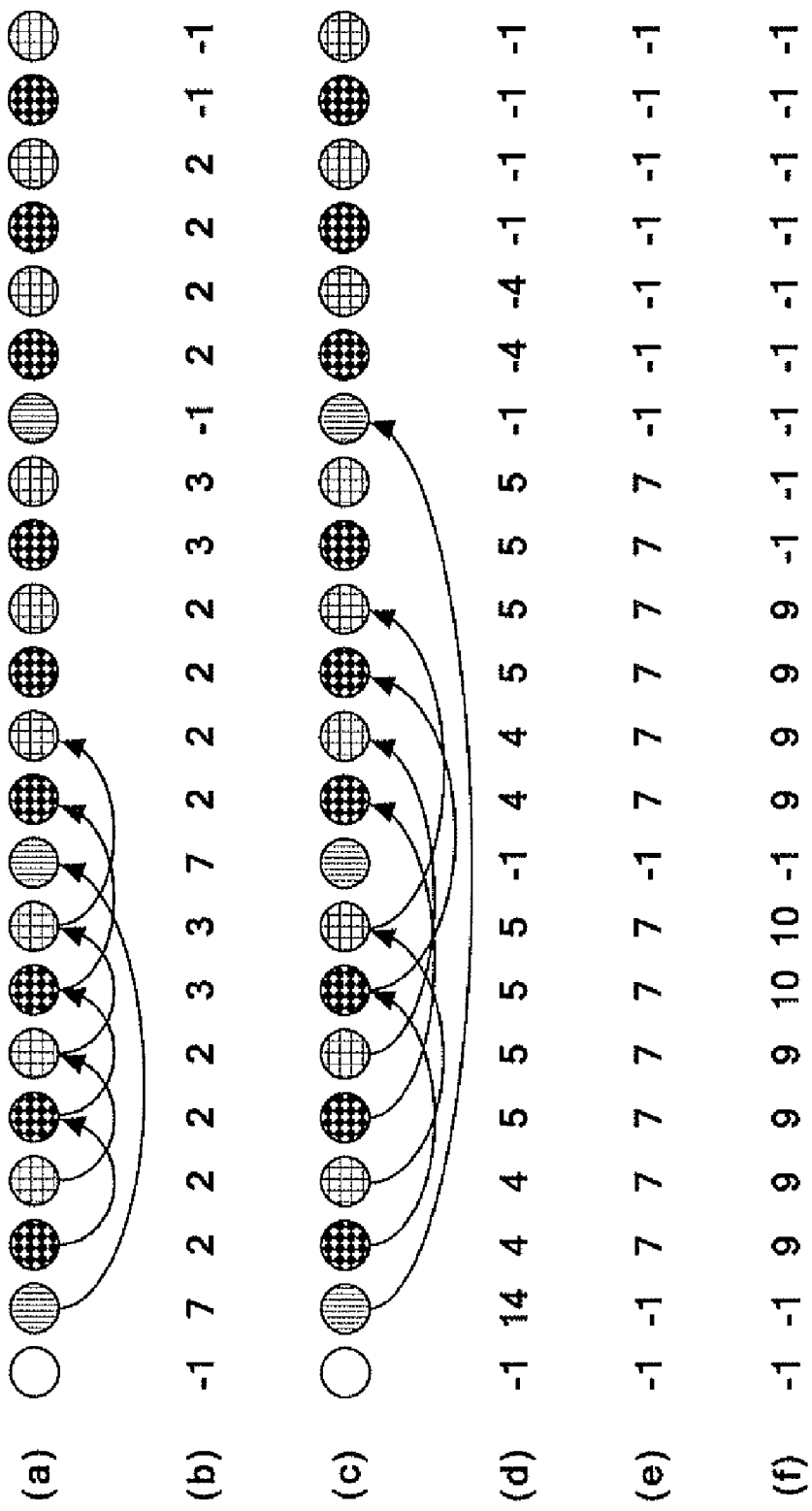
FIG. 16 is a view showing relationships between vectors of serialized nodes and distance vectors at respective stages.
Figure 18:
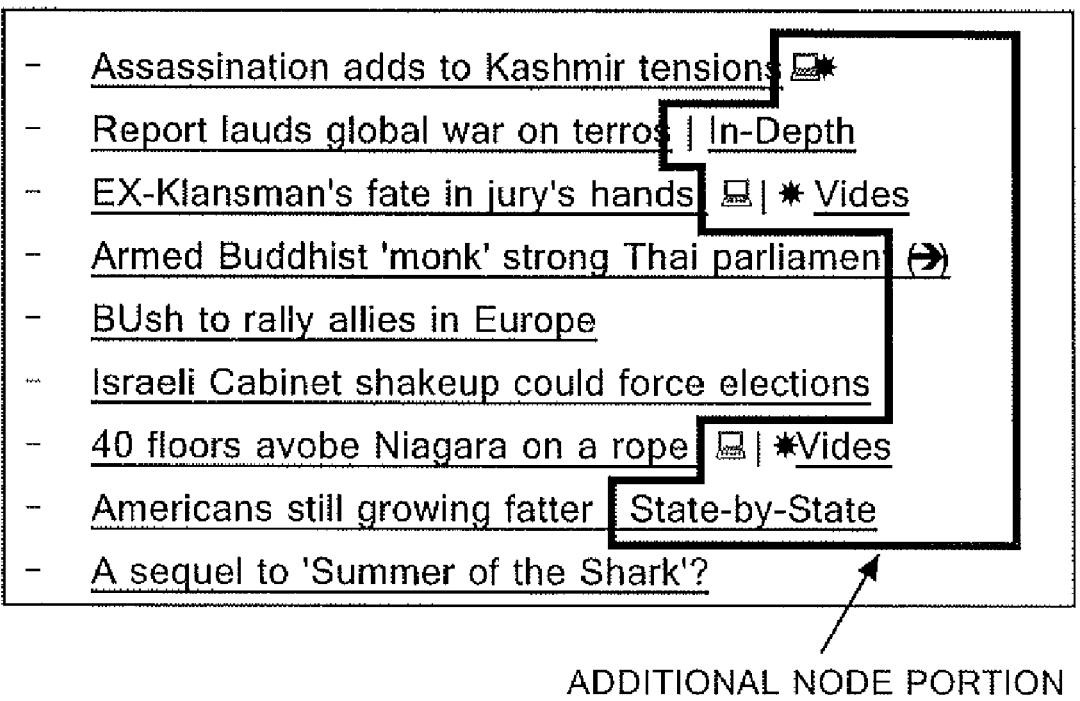
FIG. 18 is a view showing a Web content having an additional node portion on ends of repeated portions.

FIG. 15 is an example of the DOM tree. In this example, nodes corresponding to the elements div, ul and li are stationary nodes, and nodes in the lowermost layer are updated text nodes or additional image nodes. FIG. 16 shows relationships between vectors of serialized nodes and distance vectors at respective stages. FIG. 16(a) shows a serialized vector of the nodes, and FIGS. 16(b) to (f) show distance vectors at the first, second, third and fourth stages, respectively. Note that this serialization is serialization of depth-preferential system. In the conversion from the DOM tree of FIG. 15 to the vector of FIG. 16(a), the "additional node (pat:type="inserted") is not incorporated in the serialized vector. Thus, a temporarily inserted content can be rejected from the calculation of the pattern, and the robustness of the pattern can be enhanced. For example, also in the pattern illustrated in FIG. 18, the portion shown in the drawing can be rejected as an "additional node portion" from the iteration determination. The additional node is included in the pattern by subsequent processing.

In addition, even if the images determined to be the bullet images in Step 8 are mutually different, these images are determined to be identical. Thus, for example, a listing pattern as shown in FIG. 19, in which the bullets are varied, can also be detected as an iteration pattern.

Furthermore, a "distance vector at the second stage" indicating a "distance to the second identical node" is calculated (FIG. 16(d)). In a similar way, distance vectors at the third stage (FIG. 16(e)) and the fourth stage (FIG. 16(f)) are sequentially calculated, and the number of stages is increased until the value (number) of all the nodes becomes one-third (⅓) or more of the vector length. This is because one iteration of the longest iteration pattern becomes one-third (⅓) or less of the vector length. In the example of the drawing, the vector length is 22 nodes, and therefore, it is not necessary to calculate distance vectors at stages after the fourth stage (FIG. 16(f)).

Step 10: An iteration pattern is detected based on the vectors calculated in Step 9. Specifically, "a portion where the same distance is repeated twice or more" in the distance vector is searched. For example, in the case where the distance "5" is repeated, when the total distance exceeds 10, the iteration pattern is detected. The reason of the above operation is that the same element pattern is repeated three times or more.

In the example of FIG. 17, patterns are detected across the first stage and the third stage. In this case, the patterns may be included in the distance vectors at the second and third stages. However, in this case, checking is made such that the iteration pattern "does not bridge across" the subtrees. For example, in the case where a DOM structure to be described below is present, checking is made such that ranges from 6 to 10 and from 11 to 15 are not detected but ranges from 8 to 12 and from 13 to 17 are detected as iterations. Specifically, a distance of an iteration of lower nodes is adapted not to be detected across an iteration of upper nodes.

```
1:  <ul>
2:      <li>
3:          <b>keizai (economy)
4:          </b>
5:      </li>
6:      <li><pat:text pat:type="updated"/></li>
7:  </ul>
8:  <ul>
9:      <li><pat:text pat:type="updated"/></li>
10:     <li><pat:text pat:type="updated"/></li>
11:     <li><pat:text pat:type="updated"/></li>
12: </ul>
13: <ul>
14:     <li><pat:text pat:type="updated"/></li>
15:     <li><pat:text pat:type="updated"/></li>
16:     <li><pat:text pat:type="updated"/></li>
17: </ul>
```

Step 11: The detected repeated portions are enclosed by <repeat> tags, and the iteration is removed. With regard to the repeated portions, in addition to the portions where the identical distances ("7" in FIG. 17) continue, a portion corresponding to the last of the iteration is added to the pattern.

Furthermore, the inserted nodes rejected during the serialization in Step 7 are inserted into the corresponding positions.

```
<div>
    <repeat>
        <ul>
            <li><pat:text pat:type="updated"/></li>
            <li><pat:text pat:type="updated"/></li>
            <li><pat:text pat:type="updated"/>
                <img src=" . . . /new.gif" pat:type="inserted">
            </ls>
        </ul>
    </repeat>
</div>
```

Step 12: The classified tree structure is shaped as a pattern for matching. An output example of this algorithm will be shown. For the sake of convenience, not the existing pattern matching description but an original expression in which a few tags are added to the html description will be used in the following description. This is because readability of the algorithm is considered, and the algorithm can be converted into the existing language equivalent thereto in description capability. This will be described later. FIGS. 20 and 21 show images of web contents of News LYCOS and CNN.COM as examples of Web contents including the iterations, respectively. Moreover, FIG. 22 shows an image of a Web content in which ten or more tables are continuous in td. Patterns (in XML format) automatically generated from these Web contents will be shown below. The base tag set accords with xhtml, and tags for the pattern are inserted thereinto as pat name spaces. Note that, in the Web content of FIG. 21, the pattern (in XML format) automatically generated on the assumption that two tables are selected from among the ten or more continuous tables is shown.

In addition, a notation is used here, which expresses the iteration and the like by means of a prefix "pat" by utilizing the name space, and however, this notation is set equivalently replaceable with another normal tree expression/description. For example, TREX for use in relaxNG has description power sufficient for the pattern in this method, and is usable for the pattern description of this method. This will be described later.

Pattern (in XML Format) Automatically Generated from the Web Content of FIG. 20

```
<table width="168">
    <tbody>
        <tr bgcolor="dedede">
            <td>
                <b>
                    <span>topics</span>
                </b>
            </td>
        </tr>
        <pat:repeat>
            <tr bgcolor="ffffff">
                <td>
                    <small>
                        <a>
                            <pat:text pat:type="updated">
                        </a>
                    </small>
                </td>
            </tr>
        </pat:repeat>
        <tr bgcolor="ffffff">
```

-continued
```
            <td>
                <small>
                    <div align="right">
                        <span> [ </span>
                        <a>
                            <span>motto-miru (see more)</span>
                        </a>
                        <span> ] </span>
                    </div>
                </small>
            </td>
        </tr>
    </tbody>
</table>
```
Pattern (in XML format) automatically generated from the Web content of FIG. 21
```
<table width="345">
    <tbody>
        <tr>
            <td bgcolor="#CC0000" style="background-color: #c00;">
                <span class="cnnMainHeaderBarText" style="color: #fff">
                    <b>
                        <span>?AMERICA AT HOME?</span>
                    </b>
                </span>
            </td>
            <td bgcolor="#000033" style="background-color: #003;" width="60%" align="right">
                <span class="cnnMainHeaderBarText">
                    <a style="color: #fff">
                        <b>
                            <span>more>></span>
                        </b>
                    </a>
                    <span>?</span>
                </span>
            </td>
        </tr>
        <tr>
            <td colspan="2">
                <div class="cnnMainT2List">
<!-- investigation -->
                    <pat:repeat>
                        <div style="padding-top: 3px; padding-bottom: 3px;">
                            <li>
                                <span class="cnnMainT2Area">
                                    <a>
                                        <pat:text pat:type="any">
                                    </a>
                                </span>
                            </li>
                        </div>
                    </pat:repeat>
                    <div style="padding-top: 3px; padding-bottom: 3px;">
                        <li>
                            <span class="cnnMainT2Area">
                                <a>
                                    <pat:text pat:type="any">
                                </a>
                            </span>
                        </li>
                    </div>
                    <div style="padding-top: 3px; padding-bottom: 3px;">
                        <li>
                            <span class="cnnMainT2Area">
                                <span>Fact Sheet: </span>
                                <a>
                                    <pat:text pat:type="any">
                                </a>
                            </span>
                        </li>
                    </div>
<!-- /investigation -->
                </div>
            </td>
        </tr>
    </tbody>
```

-continued
```
</table>
```
Pattern (in XML format) automatically generated from the Web content of FIG. 22
```
<td width="99%">
    <pat:element pat:type="any">
    <table width="100%" pat:type="targetnode">
        <tbody>
            <tr bgcolor="dedede">
                <td>
                    <b>
                        <span>keizai (economy)</span>
                    </b>
                    <small>
                        <pat:text pat:type="any">
                    </small>
                </td>
                <td align="right">
                    <small>
                        <a>
                            <span>keizai (economy)</span>
                        </a>
                        <span> | </span>
                        <a>
                            <span>kigyo (enterprise)</span>
                        </a>
                        <span> | </span>
                        <a>
                            <span>market</span>
                        </a>
                    </small>
                </td>
            </tr>
        </tbody>
    </table>
    <table width="100%" pat:type="targetnode">
        <tbody>
            <tr>
                <td>
                    <a>
                        <b>
                            <pat:text pat:type="any">
                        </b>
                    </a>
                    <small>
                        <nobr>
                            <pat:tex pat:type="any">
                        </nobr>
                    </small>
                </td>
            </tr>
            <tr>
                <td>
                    <pat:text pat:type="any">
                    <nobr>
                        <pat:text pat:type="any">
                        <a>
                            <pat:text pat:type="any">
                        </a>
                        <pat:text pat:type="any">
                    </nobr>
                    <nobr>
                        <pat:text pat:type="any">
                        <a>
                            <pat:text pat:type="any">
                        </a>
                        <pat:text pat:type="any">
                    </nobr>
                </td>
            </tr>
        </tbody>
    </table>
    <pat:element pat:type="any">
</td>
```

Type B: Calculation of Matching Pattern when Past Page is not Present

The case where the past page is not present occurs not only when the caching of the past pages is not performed but also when the URLs are generated every day. For example, in the case where a date is utilized as a part of a URL as in a URL of a newspaper article, it is obvious that no past pages can be present Moreover, no past pages can be present either in the case of a search result page query or the like. In such a case, a concept of "adjacent pages" is introduced. The adjacent pages are a group of pages having conditions as below.

(a) The URLs are mutually analogous. The analogousness of the URLs is defined by an edit distance between the URLs (b) Layouts are mutually analogous. For this determination, a clustering technology by comparison of table structures of the layouts is utilized (Example: the above-mentioned Patent Document 2). This technology is a method for clustering the layouts of the respective pages by use of the embedding structures of the tables as a base, and by the technology, a list of the pages mutually analogous in layout can be obtained.

A group of pages that applies to these conditions is the "adjacent pages." Processing steps therefor will be described below. In a similar way to Type A, a state is considered, where the annotation author has already designated a certain node on the tree by use of the annotation editor.

Step 1: The list of the adjacent pages is acquired. It is assumed that a cache server has a calculation algorithm of the adjacent pages, and the list of the adjacent pages is acquired from the cache server. Not only the present adjacent pages but also the past adjacent pages are acquired.

Step 2: Difference calculations between the respective adjacent pages and a page becoming a target at present are performed. In a similar way to Step 3 of Type A, in the case of performing serialization for the difference calculations, the identifications of the text nodes and the image elements are defined by which "the character strings and the images are completely identical."

Step 3: Frequencies at which the respective nodes in the tree of the target group occur in the past pages are calculated as "stationary indices."

Step 4: In the case where the "text nodes (image elements) are present" even if the character strings and images are not matched between the adjacent pages and the target page, both are determined to be identical, and the difference calculations therebetween are performed. Nodes that are not included in the node list of Step 2 but included in a node list in this Step can be said to be "texts (images) essentially occurring and being always updated."

Step 5: The frequencies of the nodes listed up in Step 4 are calculated. Indices of these are similar to those of Step 3, and simple percentages can also be used therefor.

Step 6: The respective nodes are classified into the stationary nodes, the updated nodes and the additional nodes based on the results of Steps 3 and 5.

Such classification is performed by determining the indices by means of a certain threshold value. For example, when stationary indices exceed 70%, the nodes are determined to be stationary nodes. Examples of the results are shown in FIGS. 23 to 25. FIGS. 23(a) and 23(b) show an image of the INDEX page of asahi.com and a difference result thereof in contrast. FIG. 24 shows an image of the sports page of asahi.com, and FIG. 25 shows the difference result based on the image of FIG. 24. Actual results of the difference calculations are displayed on a color screen on which areas occurring on a larger number of adjacent pages are displayed deeper blue. In FIG. 24, fixed items in the index list are made stationary. In FIG. 23(b), areas of the items of "weather," "society" ..., and "this morning paper" and of the buttons on the left of the items are detected as the stationary nodes of which color is deeper blue though they are difficult to see because the color images in actual are displayed monochrome. Moreover, in FIG. 25, the background of the area including the body text of the article is displayed whitish gray, and it is seen that the body text of the article is detected as one to be updated.

Processing from here is similar to that subsequent to Step 8 of Type A. The greatest difference between Type A and Type B is the number of pages to be compared. In Type A, there are certain comparison objects that are the past pages. Therefore, the nodes can be classified appropriately by comparing a few pages. On the contrary, in Type B, the difference calculations must be performed for the adjacent pages, that is to say, objects that are "uncertain" and "involve a possibility that layouts thereof are essentially different." Therefore, it is desirable that the indices be calculated as statistical quantities obtained by performing the difference calculations with an order from several hundred pages to several thousand pages if possible.

Next, various utilization modes of the matching pattern generated by the present invention will be described.

Figure 26:
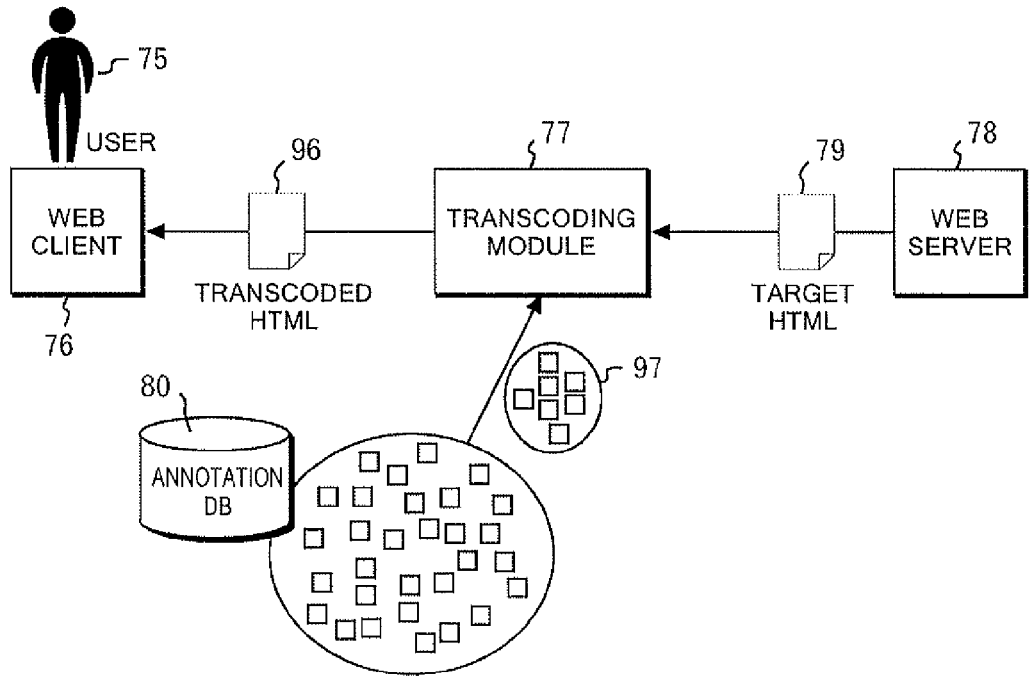
FIG. 26 is a schematic explanatory view of free annotation.

Free Annotation:

Free annotation is a method for matching a concerned group with a certain pattern even if the group occurs anywhere in a page without the XPath (or only by roughly detecting a position of the group). FIG. 26 is a schematic explanatory view of the free annotation. In FIG. 26, the same elements as those in FIG. 10 are denoted by the same reference numerals, and description thereof will be omitted. The user 75 issues a transmission request of the predetermined accessible HTML 96 to the transcoding module 77. The transcoding module 77 receives the corresponding target HTML 79 from the corresponding Web server 78, and requests the entire annotations to be associated with the target HTML 79 to the annotation database. Each in the annotation database and the annotation set 97 has a matching pattern corresponding to an annotation indicating a specific group. The annotation database selects the annotation set 97 having a matching pattern matched with each subtree of the target HTML 79, and sends the matching pattern to the transcoding module 77. The transcoding module 77 sends, to the Web client, the accessible HTML 96 prepared by transcoding the target HTML 79 based on the annotation set 97 received from the annotation database. In the transcoding module 77, robust designation of a cutout position of the target HTML 79 can be realized when the target HTML 79 is transcoded. Moreover, in the case of using the free annotation for the transcoding, the free annotation can be used for the application purpose such as a detection of a group moving in the page or a detection of a group matched with a certain pattern from among the entire pages in a certain site. This free annotation is performed after the conventional dynamic matching method, leading to a possibility that an annotation can be added to the leaked text or a page with which the annotation is not matched. Thus, a fail-safe system can be constructed.

Figure 27:
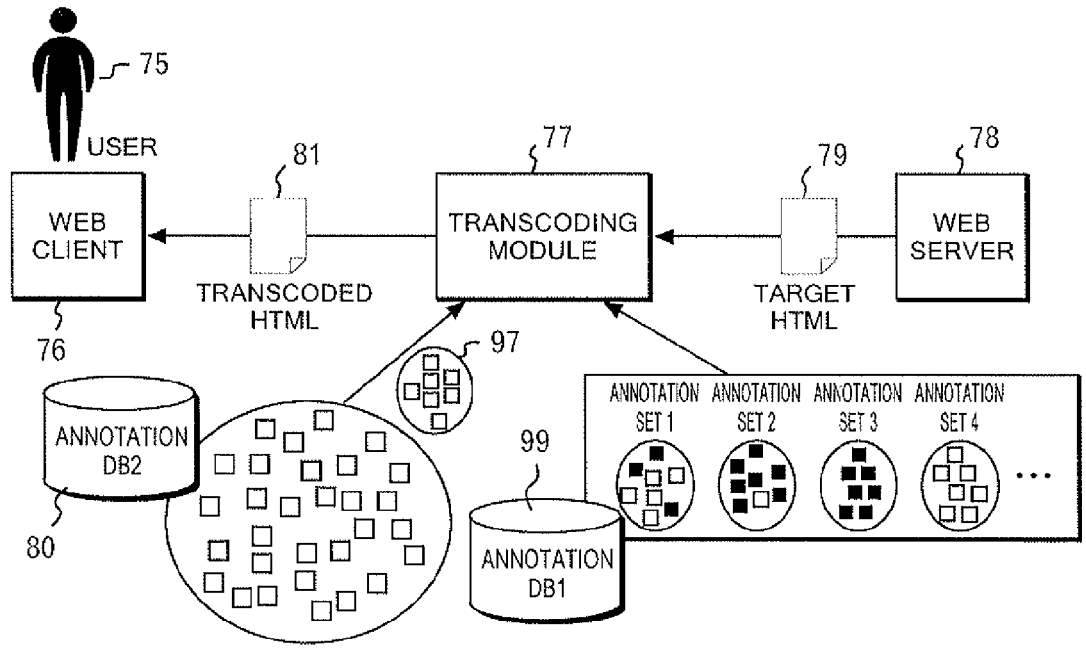
FIG. 27 is a schematic explanatory view of fail-safe annotation processing in which already publicly known dynamic matching and the free annotation of FIG. 26 are combined.

FIG. 27 is a schematic explanatory view of fail-safe annotation processing in which the already publicly known dynamic matching and the free annotation of FIG. 26 are combined. In FIG. 27, portions corresponding to those in FIGS. 10 and 26 are added with the same reference numerals, and description thereof will be omitted. At the first stage, in the dynamic matching, the transcoding module 77 searches an annotation set in which the entire annotations are matched with the target HTML 79 with regard to the XPaths. If the annotation set is present, then annotations thereof are set to the transcoding module 77. The transcoding module 77 transcodes the target HTML 79 based on the annotation set, prepares the transcoded HTML 81, and sends the transcoded HTML 81 to the Web client 76. If, in the dynamic matching, the annotation set to be matched cannot be searched in the annotation database 99 for the dynamic matching, then the transcoding module 77 issues an instruction of the free annotation to the annotation database, and receives the annotation set 97 from the annotation database 80. Subsequently, the transcoding module 77 transcodes the target HTML 79 based on the annotation set 97, prepares the transcoded HTML 81, and sends the transcoded HTML 81 to the Web client 76.

In this method, stationarity of the tree is calculated by use of the statistical method. Therefore, there are limitations that it is difficult to calculate a "series (group) of nodes of which positions are greatly changed on a DOM tree for each page." For example, it is thought that such a group of nodes does not occur frequently enough to be expressed as a statistical quantity in the case where a certain table can occur on any place every time when it is reloaded. Accordingly, the "free group" detectable by use of this method is premised on that "there is a default position that is not greatly varied," and has limitations in this point. However, as cases where such an annotation shift occurs, it is experientially known that frequencies of "new tr is inserted to cause the shit," "sequences of tr are replaced" and the like are high. This method is sufficiently effective in that it can cope with the changes described above.

Free Annotation Utilization Example: Preparation of Free Annotation by Annotation Editor The following is an operation order of the annotation editor by the author.
Step 1: Selecting an arbitrary region (subtree of the DOM tree) by the annotation editor.
Step 2: Instructing an addition of a new group.
Step 3: Checking a check box of "free annotation" in a group definition dialog, followed by automatic calculation of a matching pattern by the system.
Step 4: determining applicability of the matching pattern of Step 3 to another page by the user (author) using the annotation editor.

Figure 28:
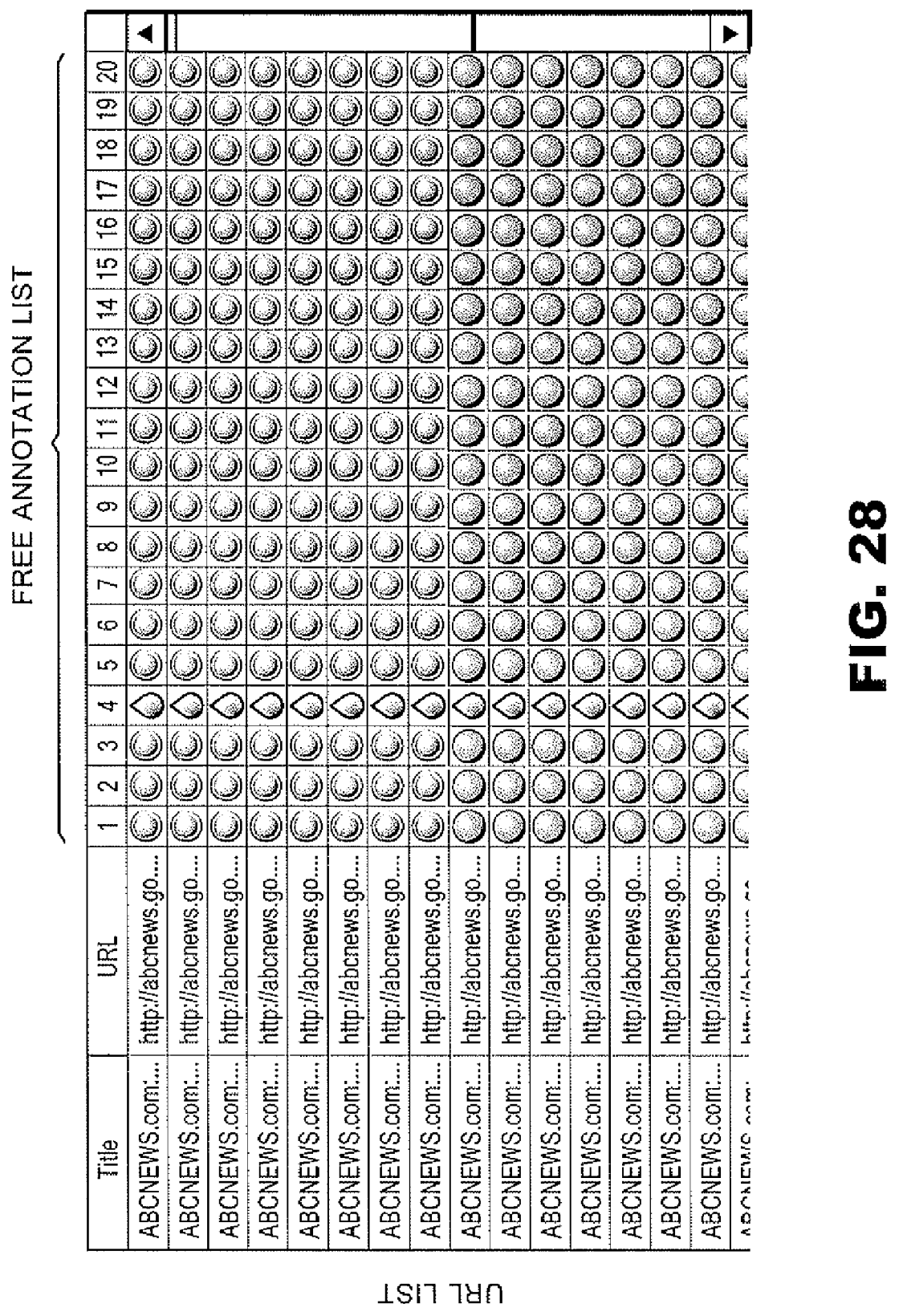

Free Annotation Utilization Example: Correction of Annotation by Site Pattern Analyzer for Free Annotation The free annotation requires a management application similar to the conventional site pattern analyzer. FIG. 28 shows an anticipated screen view of the site pattern analyzer (SPA2) for the free annotation. The URLs are arrayed on the left side of the annotation matching window, the free annotations are arrayed on the horizontal coordinate, and the matchings with the respective pages are displayed. It is possible to sort the pages by clicking the numbers of annotations. When the author discovers a pattern mistakenly matched, the author corrects the pattern by steps as below.
Step 1: Selecting a plurality of URLS correctly matched.
Step 2: Selecting the plurality of URLS mistakenly matched. Subsequently, the system corrects the matching pattern so as to be matched with the entire URLs correctly matched and not to matched with the group of URLS mistakenly matched.

Application to Conventional Dynamic Matching

Figure 29:
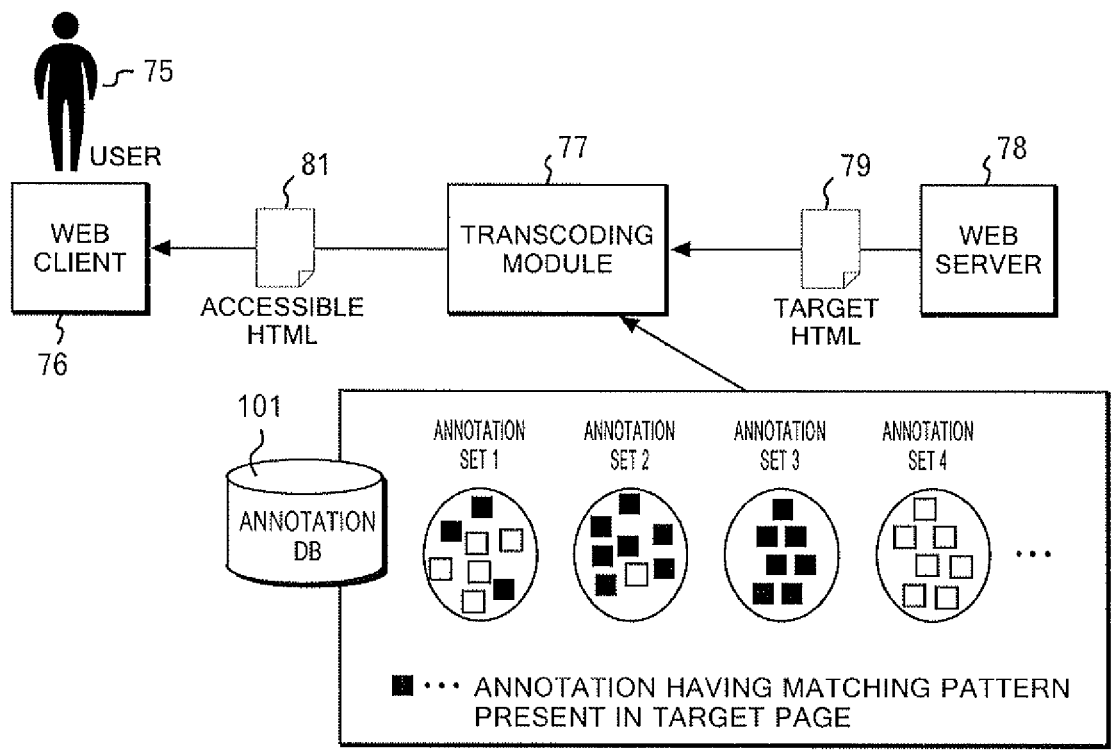
FIG. 29 is a constitutional view of a matching system in which matching by the matching pattern is incorporated into a dynamic matching method.

This method can be applied as content conditions to be added with the XPath to the conventional dynamic matching method. FIG. 29 is a constitutional view of a matching system in which the matching by the matching pattern is incorporated into the dynamic matching method. In FIG. 29, the same components as those in FIG. 26 are denoted by the same reference numerals, and description thereof will be omitted. In the annotation database 101, with regard to the target HTML 79, the matching by the matching pattern is also determined in addition to the matching by the XPath. Consequently, the determination precision is enhanced. Note that, in the respective annotation sets of the annotation database 101, the painted means annotations matched with both of the XPath and the matching pattern.

Application Example to Conventional Dynamic Matching

Addition of Group Matching as Detailed Conditions to Group by Annotation Editor

The operation procedure of the author is as follows.
Step 1: Selecting an arbitrary region (a subtree of the DOM tree) by the annotation editor. This operation is not different from the standard one.
Step 2: Instructing an addition of a new group.
Step 3: Pushing a "detailing" button in an auto-group definition dialog.

Following this operation, the system automatically calculates the matching pattern. In a standard PC (personal computer), it takes several second to several ten seconds to calculate the matching pattern for Type A, and it takes several ten second to several minutes to calculate the matching pattern for type B.
Step 4: determining applicability of the matching pattern to another page by the author using the annotation editor.

Application Example to Conventional Dynamic Matching: Application to Dynamic Matching Annotation by Site Pattern Analyzer The operation procedure of the author is as follows.
Step 1: Searching a group mistakenly matched by the site pattern analyzer.
Step 2: Selecting several pages correctly matched and several pages mistakenly matched. This operation is similar to that of semi-automatic detailing.
Step 3: Selecting a group of pages formed by the pages correctly matched from the list, and selecting the "detailing" therefor.
Step 4: Automatically generating a matching pattern with which the group of correct pages is essentially matched by use of the difference calculation.
Step 5: Confirming that the generated matching pattern is not matched with the error group. In the case where the matching with the error group occurs, the conditions are further detailed by use of the conventional semi-automatic correction function of the XPath.

Next, the precision in the case of using the adjacent pages will be described. In the case of using the adjacent pages for the purpose of generating the matching pattern, there is a problem that the generated matching pattern is greatly varied depending on the listed-up adjacent pages. FIG. 30 shows a result of difference calculation processing for a predetermined region of a certain Web content with the adjacent pages. FIG. 30(a) shows a target Web content for which the matching pattern is to be obtained. FIG. 30(b) shows a result of detecting types of nodes by the difference calculation. In FIG. 30(b), the background of the region of "kanren-joho (related information)" has a thin color similarly to the background of headline regions changed according to needs. The character string of "kanren-joho is obviously stationary and should be incorporated into the matching pattern. However, in the case of performing the differences with the adjacent pages, it is difficult to determine such variations of the place and a large character string. The present invention copes with this problem by two methods.

(a) Strict selection of the adjacent pages. Only pages considered to use the same layout are listed up by use of the above-mentioned clustering technology for the layout.
 (b) Interface for error correction. The above-mentioned site pattern analyzers SPA and SPA2 have interfaces for correcting such errors.

Determination of Types of Cutout Information

FIG. 31 is a utilization explanatory view of a matching pattern with regard to cutout of numerical values of stock prices from a Web content for stock price information. FIG. 31(a) shows a Web content submitting stock price information, and FIG. 31(b) shows stationary nodes detected by the difference calculation with the past pages. It is also thought that the cutout of the numerical values of the stock price from the table of the stock price information and the like is incorporated into the matching pattern of the annotations. For example, from text of "12-ji 13-pun koshin (updated at 12: 13), it is possible to cut out time information of HH and MM by description of: <pat:data pat:typ="date" pat:format="updated at hour HH minute MM" pat:xpath=ntable[1]/tr[1]/td[3]/text( )[1]"/>. As described above, it is also possible to incorporate the cutout portions of numerical value data and text data into the matching pattern. It is thought that, in such a way, there is a great effect for conversing the data into the RSS, WSXL or VoiceXML.

Fusion with Method of Dynamic Annotation/Utilization of Fast Algorithm Matched with XPath Set:

It is also possible to grasp the matching of the subtree of this time as matching of an XPath set. In such a way, it is possible to utilize the method of the fast matching of the XPath set, which has been proposed heretofore. However, the iterations using repeat and pat:type="inserted" cannot be expressed, and therefore, the entire matching patterns cannot be converted.

(Using the XPath of the Group as a Root)

```
/tr[1]
/tr[1]/td[1][@bgcolor="#006699"]
/tr[1]/td[1][@bgcolor="#006699"]/font[1][@color="#ffffff"]
/tr[1]/td[1][@bgcolor="#006699"]/font[1][@color="#ffffff"]/text( )[1]
/tr[1]/td[1][@bgcolor="#006699"]/font[1][@color="#ffffff"]/b[1]
/tr[2]
/tr[2]/td[1]
/tr[2]/td[1]/small[1]
/tr[2]/td[1]/small[1]/li[1]
/tr[2]/td[1]/small[1]/li[1]/a[1]
/tr[2]/td[1]/small[1]/li[1]/a[1]/text( )[1]
/tr[2]/td[1]/small[1]/li[2]
/tr[2]/td[1]/small[1]/li[2]/a[1]
/tr[2]/td[1]/small[1]/li[2]/a[1]/text( )[1]
...
/tr[2]/td[1]/small[1]/li[6]
/tr[2]/td[1]/small[1]/li[6]/a[1]
/tr[2]/td[1]/small[1]/li[6]/a[1]/text( )[1]
/tr[2]/td[1]/small[1]/li[6]/div[1][@align="right"]
/tr[2]/td[1]/small[1]/li[6]/div[1][@align="right"]/text( )[1]
/tr[2]/td[1]/small[1]/li[6]/div[1][@align="right"]/a[1]
/tr[2]/td[1]/small[1]/li[6]/div[1][@align="right"]/text( )[2]
/tr[2]/td[1]/small[1]/li[6]/div[1][@align="right"]/text( )[2]
```

Moreover, in the case of combining the matching method of dynamic annotation of this time with the conventional matching method of dynamic annotation, XPaths owned by another group and the XPaths generated from the matching pattern can also be handled integrally by listing up all of the described Xpaths.

Measures for Case where p, br and b Tags and Text Nodes Occur Randomly:

In some cases, the p, br and b tags and the text nodes occur randomly in a body text or the like of a certain content. In order to take measures for such a case, it is necessary to generate a matching pattern capable of being matched with the text even if the p, br and b tags are increased/decreased. For this purpose, processing of converting all of the p, br and b tags into "ANY" nodes in the case where a series of the p, br and b tags occurs in the target page and the past pages. Specifically, these tags are utilized as normal expressions in an "ANY" matching pattern.

Generation of Format of Existing Tree Matching Description Language:

The original pattern description has bee used this time for explaining the present invention. This pattern description can be converted into a pattern matching description language equivalent thereto. However, this conversion becomes troublesome and lowers the readability of the description because the original tree structure cannot be stored and strict description of the attributes is required, and therefore, the above pattern matching description language has not be used for the explanation. Accordingly, a part of the method for converting the notation used this time into the existing pattern matching language (relaxNG format) will be introduced.

First, a pattern as below is considered.

```
<table width="168">
    <tbody>
        <pat:repeat>
            <tr bgcolor="ffffff">
                <td>
                    <small>
                        <a>
                            <pat:text pat:type="any">
                        </a>
                    </small>
                </td>
            </tr>
        </pat:repeat>
    </tbody>
</table>
```

A conversion example where the above pattern is converted into the relaxNG format is shown below. Note that the description of the attributes is partially omitted. The relaxNG is designed to described the Schema of the entire XML document, and therefore, is constructed to described a pattern matched with all including root tags. Here, the Schema is used for matching of the subtree. Therefore, as the implementation, the processing will be performed by the following two steps.

Step 1: Listing up all of the table tags in HTML
Step 2: Evaluating the tables one by one whether they are matched with the matching pattern The following sample is premised on the implementation as described above. Note that the following is a description example according to the relaxNG format.

```xml
<?xml version="1.0" ?>
<grammar xmlns="http://relaxng.org/ns/structure/0.9">
    <start>
        <element name="table">
            <attribute name="width">
                <value>168</value>
            </attribute>
            <zeroOrMore>
                <choice>
                    <ref name="freeAttributesTABLE"/>
                </choice>
            </zeroOrMore>
            <element name="tbody">
                <zeroOrMore>
                    <choice>
                        <ref name="freeAttributresTBODY"/>
                    </choice>
                </zeroOrMore>
                <oneOrMore>
                    <element name="tr">
                        <attribute name="bgcolor">
                            <value>ffffff</value>
                        </attribute>
                        <zeroOrMore>
                            <choice>
                                <ref name="freeAttributeTR"/>
                            </choice>
                        </zeroOrMore>
                        <element name="td">
                            <zeroOrMore>
                                <choice>
                                    <ref name="freeAttributesTD"/>
                                </choice>
                            </zeroOrMore>
                            <element name="small">
                                <zeroOrMore>
                                    <choice>
                                        <ref name="freeAttributesSMALL"/>
                                    </choice>
                                </zeroOrMore>
                                <element name="a">
                                    <zeroOrMore>
                                        <choice>
                                            <ref name="freeAttributesA"/>
                                        </choice>
                                    </zeroOrMore>
                                    <text/>
                                </element>
                            </element>
                        </element>
                    </element>
                </oneOrMore>
            </element>
        </element>
    </start>
    <define name="freeAttributesTD">
        <attribute>
            <anyName>
                <except>
                    <name>width</name>
                </except>
                <except>
                    <name>height</name>
                </except>
```

The rest is omitted. In the TD tags, rows of attributes unignorable in the matching is described here.

```xml
            </anyName>
        </attribute>
```

The rest is omitted. freeAttributes definitions are arrayed below for each tag.

```xml
</grammar>
```

Limitations on this Method from Viewpoint of Matching Pattern Generation Capability:

It is known that two types, which are repeat and embed, are present as latitude of the normal expression of the tree. Between them, this method can detect only the repeat. This is based on that the necessity of describing the regularity by the embedding structure is extremely low because the tree is used for matching the regions of the HTML. Therefore, it is also possible to expand the matching pattern to an algorithm calculating the embedding structure based on a basic idea of using the statistical information.

Other Example 1

Transcoding by Annotation

It is possible to construct a "fail-safe" system covering, by use of the free annotation of this time, leaked pages, leaked information and the like as a result of unmatching with the annotation in the conventional annotation system. This greatly contributes to business through quality assurance of the transcoding. Furthermore, by performing the detailing of the matching conditions by the present invention, labor for correcting the annotations can be reduced, and the annotation authoring time can be shortened. This is also a function that greatly contributes to the business. Furthermore, the group portion that has been able to be determined only by use of the character string matching of the XPath in the conventional transcoding can be covered by the free annotation. FIG. 32 shows an example of a Web content where predetermined stationary nodes move. In FIG. 32, portions such as "LYCOS Service" and "Related Topics" sometimes move vertically, and are difficult to handle by the conventional schema. This method can also cope with such a group.

Other Example 2

Generation of RSS by Cutout of Link List

The RSS is called Rich Site Summary and is a standard for enabling the summary of the site in various ways by defining the summary of the site in the XML format and providing the defined summary. Heretofore, the RSS has been dynamically generated for each site by use of the CGI and the like. However, by use of the present invention, it becomes possible to dynamically generate the RSS from a Web page. First, a free annotation that designates a link list serving as a list of top news on a site is prepared by use of the annotation editor. An "RSS attribute" is added to this group. An RSS engine generates data in the RSS format directly from the Web page by use of this free annotation. It is difficult to realize a "group designating only a specific portion" as described above by the conventional annotation using the XPath matching. For example, in the above-mentioned example of the pattern (XML format) with reference to FIG. 20, the portions indicated in <pat:text pat:type="any"> represent the respective titles of the top articles of that day. Therefore, it becomes possible to automatically generate RSS description as below by cutting out wild card portions in the process of the pattern matching.

```
<?xml version="1.0" encoding="utf-8" ?>
<rdf:RDF
    xmlns="http://purl.org/rss/1.0/"
    xmlns:rdf="http://www.w3.org/1999/02/22-rdf-syntax-ns#"
    xm:lang="ja">
    <channel rdf:about="http://news.lycos.co.jp/topics/rss.
rdf">
        <title>News LYCOS Saishin Topics</title>
        <link>http://news.lycos.co.jp/topics</link>
        <items>
            <rdf:Seq>
                <rdf:li
rdf:resource="http://news.lycos.co.jp/topics" />
            </rdf:Seq>
        </items>
    </channel>
    <item
rdf:about="http://news.lycos.co.jp/topics/society/maff.
html">
        <title>isahayawan kinpaku-no-naka koji saikai</title>
        <link>http://news.lycos.co.jp/topics/society/maff.html
</link>
    </item>
    <item rdf:about="htp://news.lycos.co.jp/topics/world/opera-
tion.html">
        <title>arukaida sento-in amerika-ni-tokoh</title>
        <link>http://news.lycos.co.jp/topics/world/operation.html
</link>
    </item>
    <item rdf:about="http://news.lycos.co.jp/topics/computer/ms.
html>
        <title>maikurosofuto kadenbunya shinshutsu</title>
        <link>http://news.lycos.co.jp/topics/computer/ms.html
</link>
    </item>
    ... (the rest is omitted)
</rdf:RDF>
```

Other Example 3

Web Servicing of Web Page by Partial Cutout

The Web service is a technology of providing various services and applications by an exchange of the XMLs. The use of the present invention brings a possibility that the services and the applications can be easily provided in a way where the transaction of the existing Web page is partially cut out. FIG. 33 shows an example of a Web content to be used for the partial cutout. This page is a page that submits a page including results of keyword search for the past articles in a certain news site (ZDNET). A Web service performing keyword search by use of this page as a base can be constructed. Groups necessary to be designated are two. one is a form portion 103 for the search (FIG. 33). This region is composed of unmoved portions, where the matching pattern is easy to generate.

The next is one expressing the form portion 103 in the HTML.

```
<select name="idxname" size="1" tabindex="2">
    <option value="" selected>ALL ZDNet
    <option value="news">ZDNN
    <option value="zdii">ZDII
    ...
</select>
```

Next is a part (RelaxNG format) of Schema automatically generated from the above-described HTML. This Schema is utilized as Schema (1) in FIG. 34.

```
<element name="idxname">
    <choice>
        <element name="option">
            <element name="value">
                <string></string>
            </element>
        </element>
        <element name="option">
            <element name="value">
                <string>news</string>
            </element>
        </element>
        <element name="option">
            <element name="value">
                <string>zdii</string>
            </element>
        </element>
    </choice>
</element>
...
```

Figure 34:
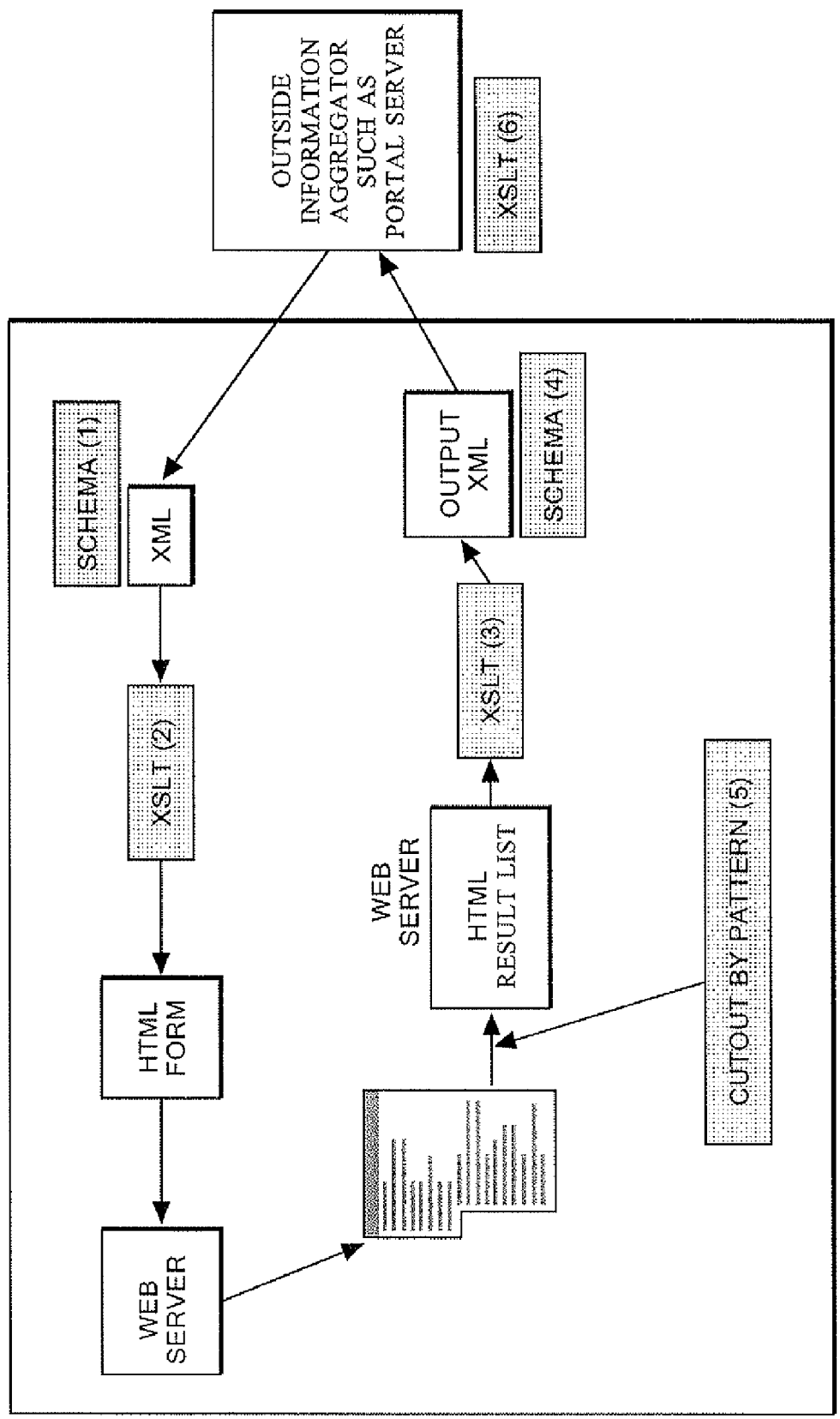
FIG. 34 is a view showing a processing course for automatically generating a Web service from the Web content of FIG. 33.

FIG. 34 shows a processing course for automatically generating the Web service from the Web content of FIG. 33. For the cut out form, it is possible to automatically generate XML Schema (Schema (1) of FIG. 34) for inputting the cut out form and XSLT (XSLT (2)) for converting this XML into an original HTML form.

```
<web_form_based_service action="./index.cgi" method="GET">
    <text>kensaku (search) keyword</text>
    <idxname>kensaku han-i shitei (search range
designation)</idxname>
    <max>saidai kensaku kekka suu (maximum search result
number)</max>
</web_form_based_service>
```

Furthermore, it is necessary to change vocabularies and to correct the automatically generated XSLT, XML Schema and WSDL. However, it will be necessary to utilize the Web service as a base for detailed development following prototyping performed therefor. Although imperfect, the use of the Web form in the way described above makes it possible to prototype the Web service relatively easily. This has been partially realizable also by a technology such as CHIP heretofore.

The problem is the portion 104 of the search results (FIG. 33). The portion 104 of the search results is a portion where a varied content is dynamically generated, and patterning for this portion is extremely difficult. However, because the use of the present invention makes it possible to determine the stationary nodes, the updated nodes and the additional nodes, and further to detect the repeated pattern, a pattern as below can be automatically generated (cutout (5) by the pattern in FIG. 34). The next pattern description corresponds to the cutout (5) by the pattern in FIG. 34, and this pattern is not in RelaxNG but in an original format.

```
<h2>kensaku kekka (search result)</h2>
<p>
    sankou hit suu (reference hit number): [
    <pat:text pat:type="any"/>
    <pat:text pat:type="any" pat:format="[0-9]+"/>
    ]
</p>
<p>
    <strong>
```

-continued

```
            <pat:text pat:type="any" pat:format="[0-9]+"/>
            pieces of documents matched with search expression
            were found.
        </strong>
    </p>
<dl>
<repeat>
    <a>
        <pat:text pat:type="any"/>
        <b>
            <font color=blue>
                <pat:text pat:type="any"/>
            </font>
        </b>
        <pat:text pat:type="any"/>
        <pat:text pat:type="inserted"/>
    </a>
    font color=red size=-2>
        (
        <em>
            <pat:text pat:type="any"/>
        </em>
        )
    </font>
    <br>
        <pat:text pat:type="any"/>
        <b>
            <font color=blue>
                <pat:text pat:type="any"/>
            </font>
        </b>
        <pat:text pat:type="any"/>
        <pat:text pat:type="inserted"/>
        <br>
        <font color=green>
            <pat:text pat:type="any"/>
        </font>
        <br><br>
</repeat>
```

The cutout of the result portions can be performed form this pattern, and the XML to be outputted can be generated therefrom. Then, the repeated portions are itemized, and it is possible to automatically generate the XML Schema ((4) in FIG. 34) for outputting the updated portions except for the repeated portions by special tags, the XSLT ((3) in FIG. 34) for converting the HTML of the cut out portions into the XML format, and the XSLT ((6) in FIG. 34) for decoding the XML to the HTML.

Other Example 4

Application to Information Aggregator

Partial cut out of Web pages and integration of information are broadly performed in a portal construction system such as the IBM PortalServer and an information extraction/submission system such as the IBM mySiteOutliner. The present invention is applicable to these systems. For example, in the IBM mySiteOutliner, XPath as below is held in a definition file in order to extract a headline link list from the Web page.

```
<ClippingDefinition>
    <id>2</id>
    <links>
        <link title="Club IBM Top
Page>http://www.ibm.com/jp/pc/ clubibm/index.html</link>
    </links>
    <urldata>
        <url source="Club IBM">http://www.ibm.com/jp/pc/
clubibm/index.html</url>
        <xpathlists>
            xpath name="body text">
/html[1]/body[1]/table[2]/tbody[1]/tr[1]/td[2]/table[2]/tbod
y[1]/tr[5]/td[2]/table[1]/tbody[1]/tr[1]/td[1]/table[2]/tbod
y[1]/tr[2]/td[1]
            </xpath>
        </xpathlists>
    </urldata>
</ClippingDefinition>
```

The designation of the cut out portions depends on the underlined Xpath. Usually, the XPath format is weak against the layout change, thus causing a problem of a large load in maintenance. Specifically, a person must monitor the layout change, and when there is a change, it is necessary to manually author a correct XPath again. In the case of the mySiteOutliner, the layout change is informed in advance because a subject thereof is in-company page contents. Therefore, the mySiteOutliner copes with the above-described problem by delivering the XML file corrected simultaneously with the layout change to the users. However, the problem of the management cost is still present.

On the contrary, the application of the present invention makes it possible to automatically generate the matching pattern in a way below. This pattern uses, as keys, contents of the subject table, and particularly, a stationary character string such as "shincyoku-jyouhou (What's New)" and an attribute of the table. Therefore, this pattern is not shifted unless a change for these character string and attribute occurs. The matching pattern according to the present invention is excellent in that it is completely robust for the insertion of the table immediately under the body, the insertion of tr into the upper table tag, which cause shifts under the current circumstances, and the insertion of the div tag and the span tag into the upper nodes, which does not cause a visual influence.

```
<tr>
    <td width="440" height="20" bgcolor="#CCCCCC">&nbsp;
shincyoku-jyouhou (What's new) </td>
</tr>
<tr>
    <td>
        <table border="0" cellpadding="0" cellspacing="2">
            <tbody>
                <repeat>
                    <tr>
                        <td>
                            <pat:img pat:img_type="bullet"/>
                        </td>
                        <td>
                            <a>
                                <font color="#006699"><pat:text
pat:type="any"/> </font>
                            </a>
                        </td>
                    </tr>
                </repeat>
            </tbody>
        </table>
    </td>
</tr>
```

As cases where the robustness is lost in this pattern, for example, cases as below are considered.
  (a) Contents matched with the same pattern are inserted into the same page.
  (b) Attributes such as a background color and a font color are changed.

Case (a) means that a region identical also visually occurs, and the case is considered rare. For case (b), there is no measure but generation of another pattern. However, in the present invention, there is a possibility that a robust pattern can be generated for both of the layouts (before and after the layout change) by also using the pages before the layout change for calculating the statistical quantity. Therefore, the present invention can also cope with the problem in the case (b).

In conclusion, the following items are disclosed regarding the constitution of the present invention.

(1): A processing apparatus for a structured/hierarchical content, which makes a determination whether or not a structured/hierarchical content delivered through a network includes a content portion matched with a predetermined matching pattern, and performs predetermined processing for the structured/hierarchical content if a result of the determination is positive, the processing apparatus includes: target subtree setting means for setting a target subtree relating to a range including a target content portion as an extracted portion of the matching pattern in the structured/hierarchical content (hereinafter, referred to as a "target content") from which the matching pattern is to be extracted; occurrence mode detecting means for detecting an occurrence mode of each node of the target subtree by selecting a plurality of past structured/hierarchical contents with respect to the target content and collating the target subtree relating to the target content with a tree relating to each of the past structured/hierarchical contents; statistical information generating means for generating statistical information concerning an occurrence frequency of the occurrence mode of each node in the target subtree based on the plurality of past structured/hierarchical contents; classifying means for performing classification of each node of the target subtree based on the statistical information and a result of detecting the occurrence mode; and matching pattern generating means for generating the matching pattern for the target content portion based on the classification.

(2): The processing apparatus for a structured/hierarchical content according to (1) is characterized in that the predetermined processing is to associate related information with the content portion of the structured/hierarchical content.

(3): The processing apparatus for a structured/hierarchical content according to (2) is characterized in that the related information includes an annotation.

(4): The processing apparatus for a structured/hierarchical content according to (1) is characterized in that the predetermined processing is processing for copying the content portion of the structured/hierarchical content for a purpose of utilizing the content portion of the structured/hierarchical content for another structured/hierarchical content.

(5): The processing apparatus for a structured/hierarchical content according to any one of (1) to (4) is characterized in that the structured/hierarchical content is a Web content.

(6): The processing apparatus for a structured/hierarchical content according to any one of (1) to (5) is characterized in that the classifying means classifies nodes of the target subtree into stationary nodes, updated nodes and additional nodes.

(7): The processing apparatus for a structured/hierarchical content according to claim (6) is characterized in that the occurrence mode detecting means includes, as the occurrence mode to be detected, (N1) an occurrence mode where detected nodes occur in both of the target content portion and structured/hierarchical contents collated therewith and contents thereof are mutually identical, and (N2) an occurrence mode where the detected nodes occur in both of the target content portion and the structured/hierarchical contents collated therewith and the contents thereof are mutually different, and in that the classifying means classifies, into the stationary nodes, nodes of which occurrence frequency of the occurrence mode (N1) is determined to be equal to/more than a first threshold value by the statistical information, classifies, into the updated nodes, nodes of which occurrence frequency of the occurrence mode (N2) is determined to be equal to/more than a second threshold value by the statistical information, and classifies, into the additional nodes, nodes other than the stationary nodes and the updated nodes.

(8): The processing apparatus for a structured/hierarchical content according to any one of (6) and (7) is characterized in that the matching pattern generating means includes: repeated portion detecting means for detecting a repeated portion in the target subtree based on the classification into the stationary nodes, the updated nodes and the additional nodes; and repeated information-added matching pattern generating means for generating the matching pattern including presence information of the repeated portion.

(9): The processing apparatus for a structured/hierarchical content according to (8) is characterized in that the classifying means includes: formed-for-spacer image detecting means for detecting whether or not a node relating to an image is a node relating to a formed-for-spacer image for ensuring a blank region; bullet image detecting means for detecting whether or not the node relating to the image is a node relating to a plurality of bullet images used repeatedly in a same size; first classifying means for classifying the node relating to the formed-for-spacer image into the additional nodes; and second classifying means for allocating a plurality of the nodes relating to the bullet image into a same classification among classifications of the stationary nodes, updated nodes and additional nodes even if display contents of the plurality of nodes are mutually different.

(10): The processing apparatus for a structured/hierarchical content according to any one of (1) to (9), further includes: collating means for collating the target subtree relating to the target content with the trees relating to a plurality of structured/hierarchical contents adjacent to the target content by selecting the adjacent structured/hierarchical contents in place of the past structured/hierarchical contents with respect to the target content when the past structured/hierarchical contents are not present.

(11): A processing apparatus for a structured/hierarchical content, which makes a determination whether or not a structured/hierarchical content delivered through a network includes a content portion matched with a predetermined matching pattern, and performs predetermined processing for the structured/hierarchical content if a result of the determination is positive, the processing apparatus includes: target subtree setting means for setting a target subtree relating to a range including a target content portion as an extracted portion of the matching pattern in the structured/hierarchical content (hereinafter, referred to as a "target content") from which the matching pattern is to be extracted; occurrence mode detecting means for detecting an occurrence mode of each node of the target subtree by selecting a plurality of structured/hierarchical contents adjacent to the target content and collating the target subtree relating to the target content with a tree relating to each of the adjacent structured/hierarchical contents; statistical information generating means for generating statistical information concerning an occurrence frequency of the occurrence mode of each node in the target subtree based on the plurality of adjacent structured/hierarchical contents; classifying means for performing classification of each node of the target subtree based on the statistical information and a result of detecting the occurrence mode; and matching pattern generating means for generating the matching pattern for the target content portion based on the classification.

(12): A processing method for a structured/hierarchical content, which makes a determination whether or not a structured/hierarchical content delivered through a network includes a content portion matched with a predetermined matching pattern, and performs predetermined processing for the structured/hierarchical content if a result of the determination is positive, the processing method includes: a target subtree setting step of setting a target subtree relating to a range including a target content portion as an extracted portion of the matching pattern in the structured/hierarchical content (hereinafter, referred to as a "target content") from which the matching pattern is to be extracted; an occurrence mode detecting step of detecting an occurrence mode of each node of the target subtree by selecting a plurality of past structured/hierarchical contents with respect to the target content and collating the target subtree relating to the target content with a tree relating to each of the past structured/hierarchical contents; a statistical information generating step of generating statistical information concerning an occurrence frequency of the occurrence mode of each node in the target subtree based on the plurality of past structured/hierarchical contents; a classifying step of performing classification of each node of the target subtree based on the statistical information and a result of detecting the occurrence mode; and a matching pattern generating step of generating the matching pattern for the target content portion based on the classification.

(13): The processing method for a structured/hierarchical content according to (12) is characterized in that the predetermined processing is to associate related information with the content portion of the structured/hierarchical content.

(14): The processing method for a structured/hierarchical content according to (13) is characterized in that the related information includes an annotation.

(15): The processing method for a structured/hierarchical content according to (12) is characterized in that the predetermined processing is processing for copying the content portion of the structured/hierarchical content for a purpose of utilizing the content portion of the structured/hierarchical content for another structured/hierarchical content.

(16): The processing method for a structured/hierarchical content according to any one of (12) to (15) is characterized in that the structured/hierarchical content is a Web content.

(17): The processing method for a structured/hierarchical content according to any one of (12) to (16) is characterized in that in the classifying step, nodes of the target subtree are classified into stationary nodes, updated nodes and additional nodes.

(18): The processing method for a structured/hierarchical content according to (17) is characterized in that the occurrence mode detecting step includes, as the occurrence mode to be detected, (N1) an occurrence mode where detected nodes occur in both of the target content portion and structured/hierarchical contents collated therewith and contents thereof are mutually identical, and (N2) an occurrence mode where the detected nodes occur in both of the target content portion and the structured/hierarchical contents collated therewith and the contents thereof are mutually different, and in that in the classifying step, are classified into the stationary nodes, nodes of which occurrence frequency of the occurrence mode (N1) is determined to be equal to/more than a first threshold value by the statistical information, are classified into the updated nodes, nodes of which occurrence frequency of the occurrence mode (N2) is determined to be equal to/more than a second threshold value by the statistical information, and are classified into the additional nodes, nodes other than the stationary nodes and the updated nodes.

(19): The processing method for a structured/hierarchical content according to any one of (17) and (18) is characterized in that the matching pattern generating step includes: a repeated portion detecting step of detecting a repeated portion in the target subtree based on the classification into the stationary nodes, the updated nodes and the additional nodes; and a repeated information-added matching pattern generating step of generating the matching pattern including presence information of the repeated portion.

(20): The processing method for a structured/hierarchical content according to (19) is characterized in that the classifying step includes: a formed-for-spacer image detecting step of detecting whether or not a node relating to an image is a node relating to a formed-for-spacer image for ensuring a blank region; a bullet image detecting step of detecting whether or not the node relating to the image is a node relating to a plurality of bullet images used repeatedly in a same size; a first classifying step of classifying the node relating to the formed-for-spacer image into the additional nodes; and a second classifying step of allocating a plurality of the nodes relating to the bullet image into a same classification among classifications of the stationary nodes, updated nodes and additional nodes even if display contents of the plurality of nodes are mutually different.

(21): The processing method for a structured/hierarchical content according to any one of (12) to (20), further includes: a collating step of collating the target subtree relating to the target content with the trees relating to a plurality of structured/hierarchical contents adjacent to the target content by selecting the adjacent structured/hierarchical contents in place of the past structured/hierarchical contents with respect to the target content when the past structured/hierarchical contents are not present.

(22): A processing method for a structured/hierarchical content, which makes a determination whether or not a structured/hierarchical content delivered through a network includes a content portion matched with a predetermined matching pattern, and performs predetermined processing for the structured/hierarchical content if a result of the determination is positive, the processing method includes: a target subtree setting step of setting a target subtree relating to a range including a target content portion as an extracted portion of the matching pattern in the structured/hierarchical content (hereinafter, referred to as a "target content") from which the matching pattern is to be extracted; an occurrence mode detecting step of detecting an occurrence mode of each node of the target subtree by selecting a plurality of structured/hierarchical contents adjacent to the target content and collating the target subtree relating to the target content with a tree relating to each of the adjacent structured/hierarchical contents; a statistical information generating step of generating statistical information concerning an occurrence frequency of the occurrence mode of each node in the target subtree based on the plurality of adjacent structured/hierarchical contents; a classifying step of performing classification of each node of the target subtree based on the statistical information and a result of detecting the occurrence mode; and a matching pattern generating step of generating the matching pattern for the target content portion based on the classification.

(23): A program for allowing a computer to execute the steps of the processing method for a structured/hierarchical content according to any one of (12) to (22).

Advantages of the Invention

In the present invention, not an XPath but a matching pattern is used in order to identify whether or not a structured/hierarchical content is to be subjected to processing such as partial cutout and reuse of a common annotation. Consequently, the present invention can flexibly cope with a case where the identified content portion moves in the structured/hierarchical content to be identified.

In the present invention, past and/or adjacent structured/hierarchical contents with respect to a target content are checked, and each node in a target subtree is classified based on an occurrence mode of each node and statistical information concerning an occurrence frequency of the occurrence mode, and thus the matching pattern is generated. Consequently, a matching pattern, which is significant for identifying whether or not the structured/hierarchical content is to be subjected to the processing, can be generated.

Although the preferred embodiments of the present invention have been described in detail, it should be understood that various changes, substitutions and alternations can be made therein without departing from spirit and scope of the inventions as defined by the appended claims. Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the

What is claimed is:

1. A computer-implemented method for processing structured data content comprising:

determining whether Web content delivered through a network includes a content portion matched with a predetermined matching pattern, and if a content portion is determined to match:

processing the Web content to associate related information with the content portion of the Web content, the method further comprising:

setting a target subtree having nodes relating to a range including a target content portion as an extracted portion of the matching pattern in the Web content from which the predetermined matching pattern is to be extracted;

detecting an occurrence mode of each node of the target subtree by selecting a plurality of past Web contents with respect to the Web content and collating the target subtree relating to the target content portion with a tree relating to each of the past Web contents, wherein the occurrence mode detecting step includes detecting:

a first occurrence mode wherein detected nodes occur in both of the target content portion and Web contents collated therewith and contents thereof are mutually identical; and, a second occurrence mode wherein the detected nodes occur in both of the target content portion and the Web contents collated therewith and the contents thereof are mutually different;

generating statistical information concerning an occurrence frequency of the occurrence mode of each node in the target subtree based on the plurality of past Web contents; and classifying each node of the target subtree based on the statistical information and a result of detecting the occurrence mode, wherein each node of the target subtree is classified into one of: a stationary node of which occurrence frequency of the first occurrence mode is determined to be equal to or more than a first threshold value by the statistical information, an updated node of which occurrence frequency of the second occurrence mode is determined to be equal to or more than a second threshold value by the statistical information, and additional nodes other than the stationary nodes and the updated nodes, wherein classifying the nodes of the target subtree further includes:

detecting whether a node relating to an image is a node relating to a formed-for- spacer image for ensuring a blank region;

detecting whether or not the node relating to the image is a node relating to a plurality of bullet images used repeatedly in a designated size;

a first classifying step of classifying the node relating to the formed-for-spacer image into the additional nodes; and a second classifying step of allocating a plurality of the nodes relating to the bullet image into a classification among classifications of the stationary nodes, updated nodes and additional nodes even if display contents of the plurality of nodes are mutually different; and, generating the matching pattern for the target content portion based on the classification.

* * * * *